April 2, 1963
J. KNOWLES ETAL
3,083,589
POWER TRANSMISSION MECHANISM
Filed July 21, 1958
5 Sheets-Sheet 1
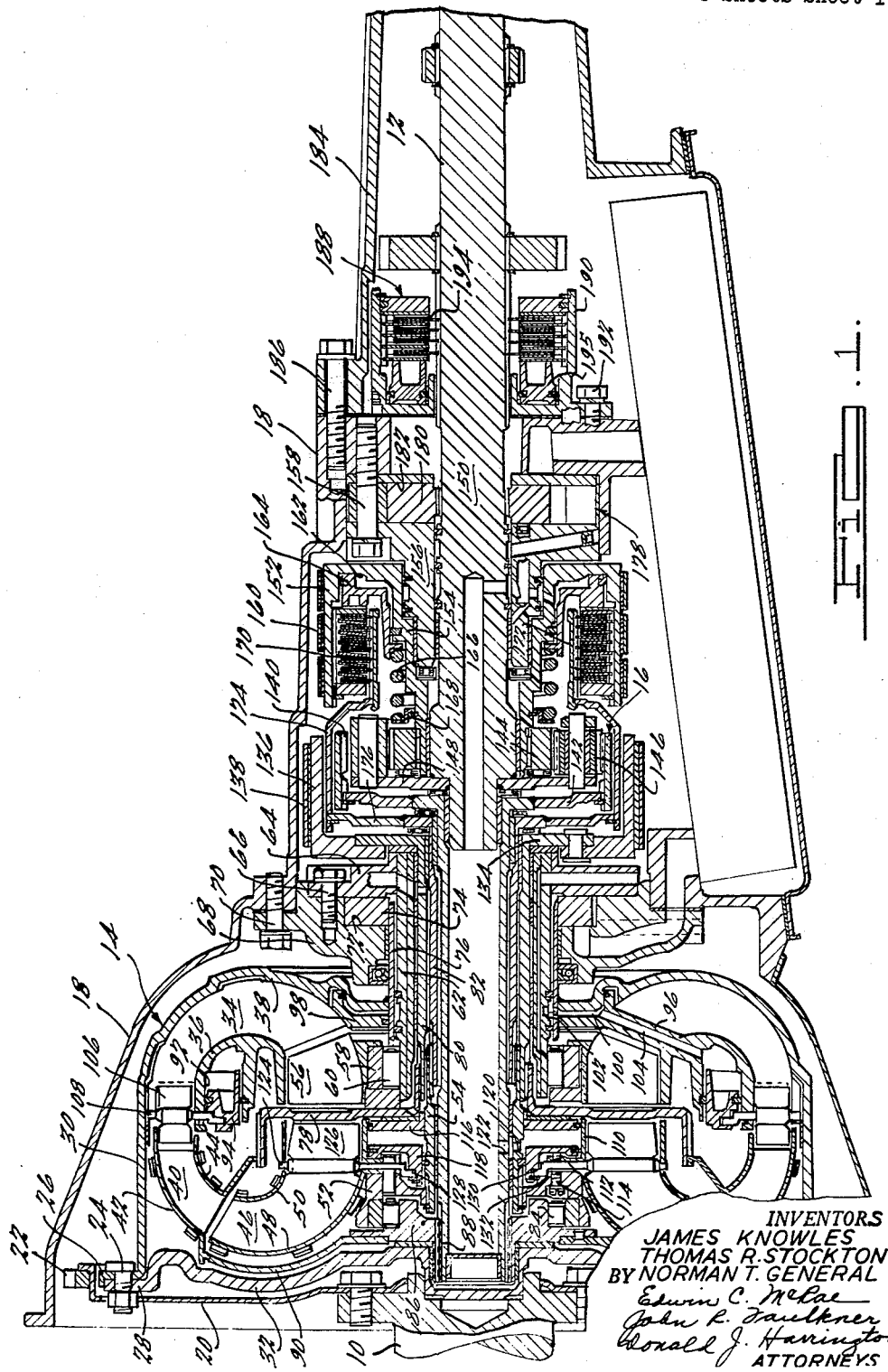
INVENTORS
JAMES KNOWLES
THOMAS R. STOCKTON
BY NORMAN T. GENERAL
Edwin C. McRae
John R. Faulkner
Donald J. Harrington
ATTORNEYS

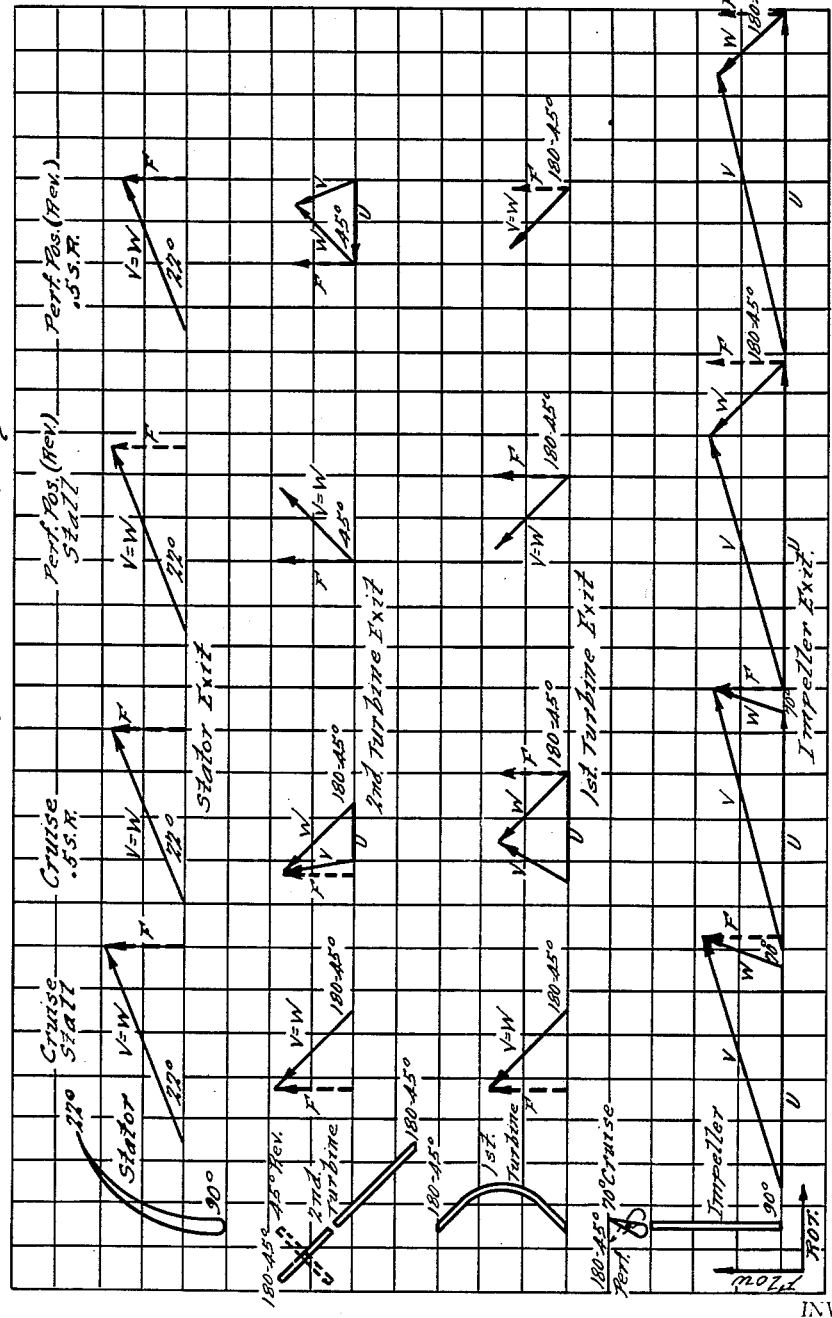

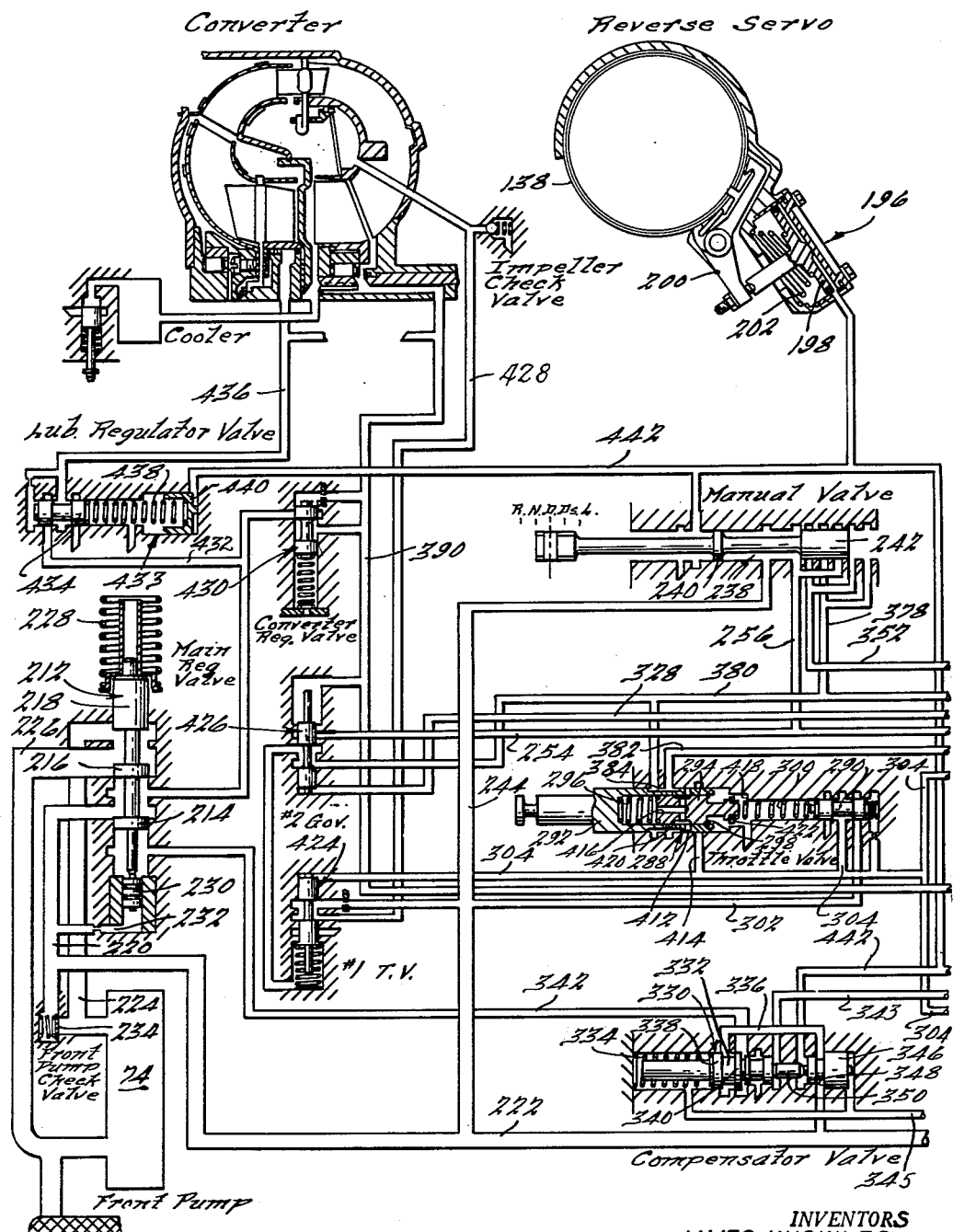

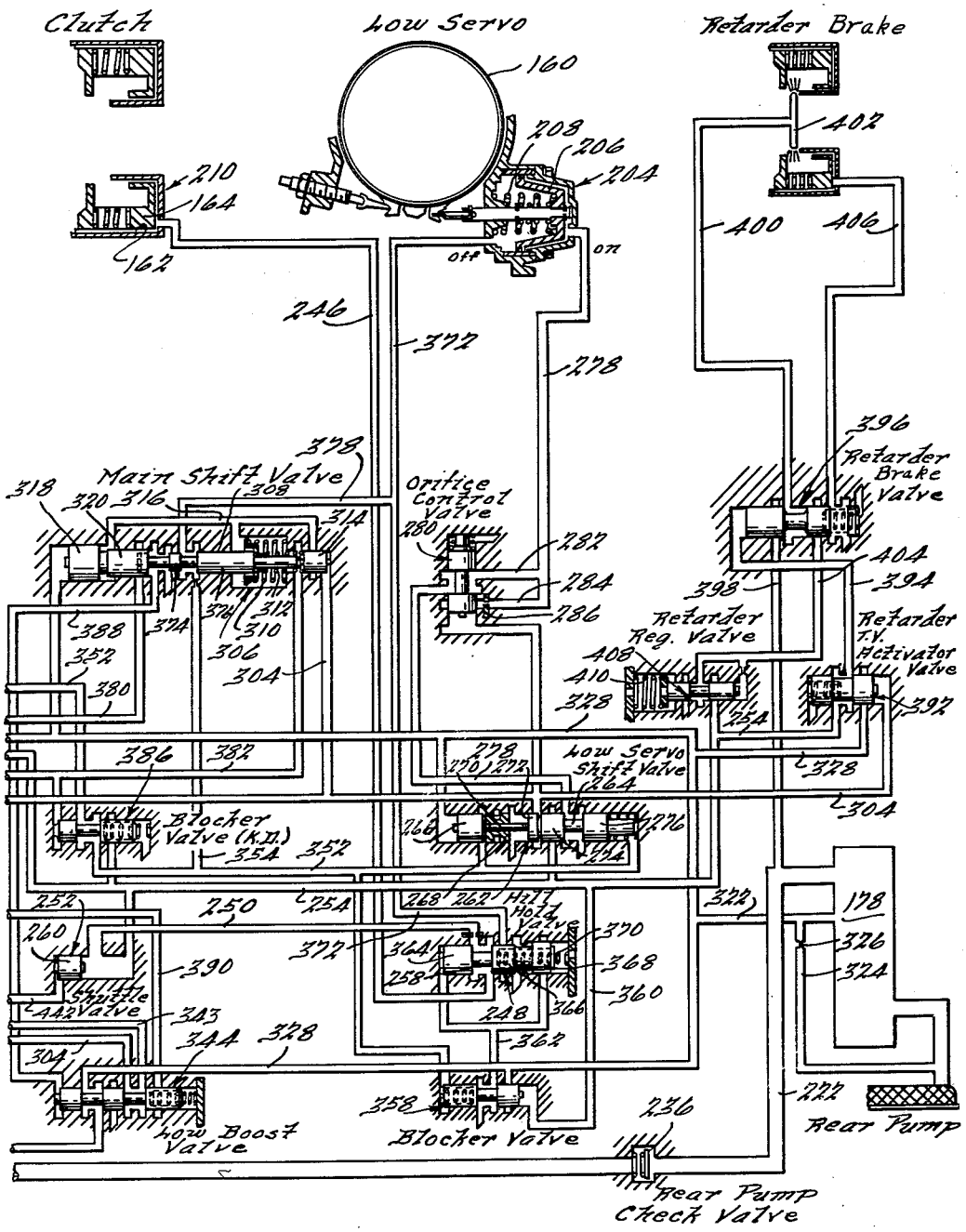

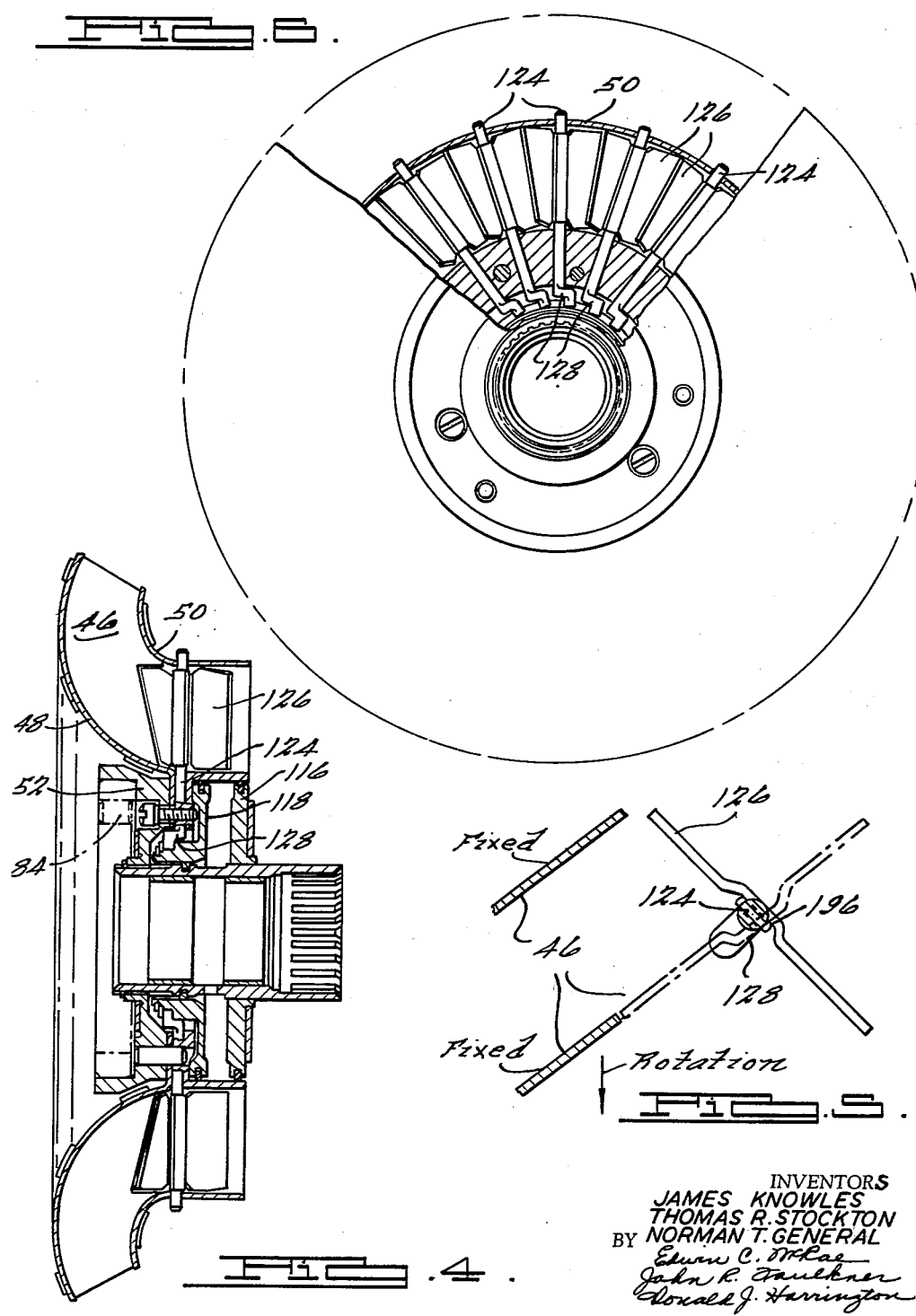

United States Patent Office 3,083,589
Patented Apr. 2, 1963

3,083,589
POWER TRANSMISSION MECHANISM
James Knowles, Birmingham, Thomas R. Stockton, Northville, and Norman T. General, Detroit, Mich., assignors to Ford Motor Company, Dearborn, Mich., a corporation of Delaware
Filed July 21, 1958, Ser. No. 749,726
25 Claims. (Cl. 74—677)

Our invention relates generally to a power transmission mechanism and more particularly to a hydrokinetic transmission particularly adapted for use with an engine driven vehicle although we contemplate that it may also have a variety of other uses.

The embodiment of our invention herein disclosed includes a multiple turbine hydrokinetic unit and a simple planetary gear unit acting in cooperation therewith in a novel manner to provide plural torque delivery paths from a driving shaft, such as a vehicle engine crankshaft, to a driven power output shaft or tailshaft.

The hydrokinetic unit and the gear unit are capable of jointly providing a relatively high over-all torque multiplication ratio during initial operation from a stalled condition and the magnitude of this ratio decreases uniformly in accordance with the driving torque demands throughout a wide range of speed ratios. The hydrokinetic unit includes primary and secondary turbine members and a pump member disposed in fluid flow relationship in a toroidal fluid circuit. The portion of the effective torque output of the hydrokinetic portion of the assembly that is contributed by the primary turbine member is greater than the torque contributed by the secondary turbine member during operation in the lower speed ratio range. But and as the speed ratio increases, the ratio of the torque transmitted by the primary turbine member to the torque contributed by the secondary turbine member progressively decreases.

An overrunning clutch means is provided for establishing a driving connection between the secondary turbine member and the primary turbine member under normal forward driving conditions and for accommodating a relative overrunning motion therebetween during reverse drive and during forward drive operation in the lower speed ratio range. The primary turbine member is directly coupled to one element of the planetary gear unit and a brake mechanism is employed for anchoring another element of the gear unit to provide the necessary reaction, the remaining planetary element being connected to the power output portions of the mechanism. The combined torque of the turbines is thus transmitted to a common element of the planetary gear unit after the one-way clutch becomes effective to establish a torque delivery path between the secondary turbine member and the primary turbine member, and this combined torque is multiplied by the gear unit to establish an increased output torque.

After the speed ratio of the hydrokinetic unit increases, the anchored element of the gear unit is released and is synchronously clutched to the secondary turbine member, a suitable clutch assembly being provided for this purpose. The two turbine members thereafter operate as a single turbine member, the effective torque ratio of the gear unit thereafter being unity.

It is thus apparent that the transmission assembly is capable of operating in two drive ranges; namely, a low drive range in which the gear unit is effective to increase the net output torque of the assembly and a high drive range in which the torque ratio of the gear unit is unity.

According to a principal feature of our invention, provision is made for obtaining a reverse torque delivery path by using the same gear elements and converter components that are employed during forward drive. This is accomplished by forming the secondary turbine member with separate inlet and outlet sections, the outlet section being adjustable relative to the inlet section to provide different effective blade exit angles for reverse and for forward drive conditions. The exit section may normally assume an angle which is favorable to forward driving torque delivery, and servo means are provided for adjusting the effective turbine exit angle to provide a reverse turbine torque which in turn is transmitted to the planetary gear elements. An independent brake band is provided for anchoring the primary turbine member and one element of the gear unit during reverse drive operation, and after reverse operation is completed the reverse brake may be released and the secondary turbine exit section may be readjusted so that the effective secondary turbine blade exit angle is favorable for forward torque delivery. The need for providing a separate reverse gear mechanism is thus eliminated.

Similarly, the exit section of the secondary turbine member may be adjusted during forward drive operation to the reverse torque position to obtain a zero torque shift if this is desired so that the sequential operation of the low speed brake and the direct drive clutch will be characterized by a maximum degree of smoothness.

According to another feature of our invention, provision is made for conditioning the transmission for relatively high torque ratio operation to effect maximum acceleration. This is accomplished by forming the pump member with an adjustable blade exit section which may be adjusted to an angle which is favorable to high torque, high torus flow operation. Suitable servo means are provided within the automatic control system for the transmission for effecting an appropriate adjustment of the pump blade exit section. According to a preferred arrangement, the transmission control system further includes means for conditioning the planetary gear unit for torque multiplication when maximum acceleration is desired following normal, cruising operation, and this occurs concurrently with the above mentioned adjustment of the blade exit section of the pump member to the high acceleration position.

The provision of an improved hydrokinetic transmission mechanism of the type set forth above being an object of our invention, it is a further object to provide a transmission mechanism with a multiple turbine hydrokinetic unit and a gear unit coacting therewith whereby the individual turbine elements of the hydrokinetic unit are effective to transmit a driving torque to a common portion of the gear unit, the latter being effective to change the magnitude of the effective torque supplied by the hydrokinetic unit.

It is a further object of our invention to provide a transmission mechanism having a hydrokinetic unit with primary and secondary turbines and a gear unit coacting with the turbines and wherein clutch means are provided for transmitting the torque of the secondary turbine to the primary turbine, the combined torque output of the primary and secondary turbines being transferred to a torque input element of the gear unit.

It is a further object of our invention to provide a transmission mechanism as set forth in the preceding object wherein one element of the gear unit may be anchored to provide the necessary torque reaction and wherein another element thereof is directly connected to driven portions of the mechanism.

It is a further object of our invention to provide a transmission mechanism embodying a novel arrangement of a multiple turbine hydrokinetic unit and a gear unit wherein the effective torque output of the hydrokinetic unit is transferred to a planetary gear unit and wherein clutch and brake means are provided for controlling the relative motion of the elements of the gear units to produce two ranges of over-all driving torque ratios.

It is a further object of our invention to provide a mechanism as set forth in the preceding object wherein means are provided for effecting a smooth shift from one driving torque ratio to another.

It is a further object of our invention to provide a transmission mechanism incorporating a multiple turbine hydrokinetic unit and a simple gear unit acting in cooperation therewith wherein the components used for obtaining a forward driving torque delivery may also be adapted for delivering a reverse driving torque to the mechanism thereby eliminating the need for providing additional components for reverse torque delivery.

It is a further object of our invention to provide a hydrokinetic transmission mechanism of simplified construction in which the performance is characterized by a high degree of smoothness.

It is a further object of our invention to provide a hydrokinetic transmission mechanism of the type above set forth in which means are provided for conditioning the mechanism for hill braking during which the torque is transmitted in a reverse direction through the mechanism and readily absorbed by the engine.

Further objects and characteristics of our transmission mechanism will readily become apparent from the following description of a preferred embodiment of our invention and from the accompanying drawings wherein:

FIGURE 1 is a longitudinal cross sectional view of an assembly view of a preferred embodiment of our invention;

FIGURE 2 is a chart showing the vector diagram for the fluid flow in the hydrokinetic torque converter circuit;

FIGURES 3a and 3b show a schematic representation of the automatic controls of a transmission mechanism;

FIGURE 4 is a cross sectional subassembly view of the secondary turbine member of the hydrokinetic unit;

FIGURE 5 is a view showing an adjustable blade element of the secondary turbine member;

FIGURE 6 is an illustration, partly in section, of the secondary turbine member as viewed in the direction of the transmission axis.

For the purpose of particularly describing a preferred embodiment of the invention, reference will first be made to the assembly view illustrated in FIGURE 1 wherein numeral 10 designates an engine crankshaft and numeral 12 designates a power output shaft or tailshaft. The transmission mechanism used for providing multiple torque delivery paths between the crankshaft 10 and the tailshaft 12 comprises a hydrokinetic unit generally shown at 14 and a planetary gear unit generally shown at 16. The hydrokinetic unit 14 and the gear unit 16 are enclosed by a housing 18 which may be connected in the usual fashion to the engine block of a vehicle engine. By preference the housing 18 is constructed in one piece and, as will subsequently become apparent, it may be formed with reduced dimensions by reason of the unique physical arrangement of the elements of the mechanism.

The crankshaft 10 has secured thereto a drive plate 20 having a starter ring gear 22 joined to the periphery thereof in the usual fashion. The drive plate is secured by bolts 24 to cooperating flanges 26 and 28 respectively formed on a pump housing 30 and on a housing plate 32, the housing 30 and plate 32 forming a part of the hydrokinetic unit 14. The pump housing 30 defines in part a torque converted pump 34 having radially disposed blades and inner and outer shrouds shown at 36 and 38. A primary turbine member is shown at 40 and it includes turbine blades situated at angularly spaced locations about the axis of the transmission between an outer shroud 42 and an inner shroud 44, the entrance section for the primary turbine 40 being disposed in juxtaposed relationship with respect to the exit section of pump 34. A secondary turbine member is shown at 46 and it also includes a plurality of blades disposed in angularly spaced relationship between inner and outer shrouds 48 and 50, respectively. It is carried by a hub 52 to which the radially inward portion of the shroud 48 is joined. The hub 52 is positively splined or otherwise secured to a sleeve 54 extending longitudinally as indicated.

Hydrokinetic unit 14 further includes a reactor 56 having radially disposed blades positioned between the exit section of secondary turbine 46 and the entrance section of the pump 34, and it functions to alter the effective fluid entrance angle for the pump 34 in the usual fashion to produce a multiplication of the effective turbine torque. For this reason the hydrokinetic unit 14 will hereinafter be referred to as a torque converter unit for purposes of the present description.

The reaction 56 includes a hub 58 supported on a one-way brake 60 which in turn forms an overrunning connection between the reactor 56 and a stationary sleeve shaft 62 which extends axially and which is fixed to an adapted plate 64. Suitable bolts 66 are provided for connecting plate 64 to a transverse partition wall 68, said wall forming a physical separation between the torque converter unit 14 and a planetary gear portion of the mechanism. The wall 68 may be secured to a cooperating shoulder on the housing 18 by suitable bolts 70 and it is recessed as shown at 72 to provide a pump chamber for a positive displacement gear pump 74. This pump 74 forms a portion of an automatic control circuit for controlling the operation of the various clutch and brake elements of the transmission mechanism herein described.

The pump housing 30 is permanently secured to a hub shaft 76 which in turn is journaled by a suitable bushing in the wall 68. The shaft 76 is drivably keyed or otherwise connected to a power input gear of the gear pump 74.

The inner shroud 44 of the primary turbine member 40 is drivably connected to a torque transfer disc 78 extending through the radially inward region of the torque converter circuit and between the exit section of the secondary turbine 46 and the entrance section of the reactor 56. The outer periphery of disc 78 is preferably formed with an elongated splined portion as indicated to form a driving connection with shroud 44 and to facilitate assembly. The body of the disc 78 is suitably apertured to permit free flow of fluid throughout the torus circuit of the converter unit without interruption.

The inner portion of the disc 78 is positively splined to a sleeve shaft 80 which may be journaled by suitable bushings within the stationary sleeve shaft 62.

As previously indicated, sleeve shaft 54 is splined to the hub 52 of the secondary turbine 46 and it is also connected to another sleeve shaft 82 suitably journaled within sleeve shaft 80 as indicated. The hub 52 of the secondary turbine 46 also defines an outer race for an overrunning clutch indicated at 84, said clutch forming a one-way driving connection between an inner clutch race 86 and a centrally disposed shaft 88, the latter being splined to the inner race 86. The outer shroud 42 of the primary turbine member 40 is positively connected to the inner clutch race 86 by means of a drive plate 90. The shaft 88 is end supported by suitable bushings within sleeve shaft 82 and within the bearing recess formed in housing plate 32.

The inner pump shroud 36 is of cast construction and it defines an annular cylinder 92 within which an annular piston 94 is situated, said cylinder 92 and piston 94 defining in part a fluid pressure operated servo for adjustably positioning the blade exit section of the torque converter pump 34. The inner shroud construction includes a portion 96 extending through the converter torus circuit in a radially inward direction thereby forming a connection between the inner pump shroud itself and an annular sealing ring identified at 98. The sealing ring 98 is received within a circular recess formed in pump shroud 38 and it defines therewith a radial passage 100 which communicates with a groove 102 formed in stator shaft 62 through ports in hub shaft 76. Suitable internal passages are provided for introducing fluid pressure into groove 102 when appropriate, said passages forming a part of the automatic control circuit shown in FIGURES 3a and 3b. The portion 96 has formed therein a passage 104 extending from radial passage 100 to the annular cylinder 92 and is adapted to distribute working pressure to the piston 94. The blades for pump 34 may be cast integrally with the shroud 36 and the shroud 38 may be formed with suitable depressions as shown which cooperate with peripheral projections on the pump blades to secure the blades and the inner shroud in place.

The exit section of the pump 34 includes a plurality of blade elements 106 carried by mounting pins 108 which are mounted for rotation about a generally radial axis. One blade element 106 may be situated within each of the fluid flow passages defined by the generally radially situated pump blades for the pump 34. It is therefore apparent that when the blade elements 106 are adjusted from one angular position to another, the effective pump blade exit angles will be altered. This adjustment of the blade elements 106 is accomplished by means of a mechanical connection between the piston 94 and the pins 108, said mechanical connection comprising an offset pin portion suitably connected as indicated to the annular piston 94. When the piston 94 is moved in a longitudinal direction, the pins 108 and the associated blade elements 106 will be angularly adjusted around their respective axes.

As previously mentioned, the exit section of the secondary turbine 46 is adjustable to provide variations in the effective blade exit angle of the secondary turbine and this adjustment is accomplished by means of a servo mechanism including a servo cylinder member 110 having a radial flange 112 which in turn is bolted to the hub 52 of the secondary turbine member, suitable bolts 114 being provided for this purpose. A servo cylinder closure wall is formed by a disc 116 which is carried by the aforementioned sleeve 54. A suitable disc washer may be provided as indicated between the disc 116 and the torque transfer disc 78. The cylinder member 110 and the sleeve 54 cooperate to define an annular working space within which an annular piston 118 is situated, the piston being adapted to be adjusted in a longitudinal direction. A working chamber is defined by the piston 118 and the closure disc 116 and the fluid pressure may be admitted thereto through a port 120 formed in sleeve 54 and the communicating port 122 formed in shaft 88, said port forming a portion of the automatic control circuit for the transmission. The inner periphery of the outer shroud 48 for the secondary turbine 46 forms a radial flange and it is disposed between the hub 52 and the cylinder member 110.

A plurality of radial pins 124 is situated adjacent the exit section of the secondary turbine member and journaled in the inner shroud 50 and in cooperating openings formed in the cylinder member 110. Each pin 124 carries a blade element 126 and these blade elements are disposed relatively close to the reactor member 56. The angular position of the pins 124 and the blade elements 126 may be adjusted about radial axes and this is accomplished by means of a mechanical connection between piston 118 and an offset portion 128 located at the radially inward end of pins 124. The offset portions 128 cooperate with a circular groove formed in the piston 118. This groove is preferably defined by a recess 130 and by cooperating retainer ring 132 held in place by a suitable snap ring as indicated. It is thus apparent that when fluid pressure is admitted into the working chamber between the piston 118 and the closure disc 116, the piston 118 will be moved axially thereby rotatably adjusting the pins 124 to alter the effective secondary turbine exit angle. It is contemplated that a torque reversal may be obtained when the magnitude of the torus flow velocity is within a predetermined operating range and when the blades 126 are adjusted to a reverse torque position and this reverse torque may be utilized, as will subsequently be explained, to obtain a reverse drive. It is further contemplated that when the blades 126 are adjusted to the other extreme position, the secondary turbine member 46 will be conditioned for a positive torque delivery for effecting forward drive operation.

Sleeve shaft 80 has formed thereon a radially extending flange 134 which has secured thereto a brake drum 136. A reverse brake band 138 encircles drum 136 and it may be applied by a fluid pressure operated servo in a conventional manner to anchor sleeve shaft 80.

The shaft 88 is drivably connected to a ring gear 140 of the planetary gear unit 16 by means of a drive member 142. A planetary sun gear is shown at 144 and it is situated in driving engagement with planet gears 146 suitably journaled on the carrier identified by numeral 148. The carrier 148 is in turn secured to a power output shaft 150 for accommodating the transmission of driving torque from the carrier to driven portions of the mechanism.

A brake drum is shown at 152 and it includes an inwardly disposed axial extension 154 which may be rotatably journaled on a telescopically associated extension of a supporting member 156 which in turn may be secured by bolts 158 to the rearward portion of the transmission housing 18. Extension 154 has secured thereto the sun gear 144 and additional support may be provided for the sun gear 144 and extension 154 by journaling the same on the power output shaft 150.

A friction brake band 160 surrounds the brake drum 152 and it is adapted to be energized by means of a fluid pressure operated servo by anchoring the brake drum 152 and the associated sun gear 144. The drum 152 and extension 154 cooperate to define an annular working chamber 162 within which is slidably situated an annular piston 164, said piston and cylinder cooperating to define a fluid pressure chamber. A piston return spring is shown at 166 and it is adapted to act on the piston 164, a suitable spring seat 168 being secured to extension 154 by a suitable snap ring to provide a seat for the spring 166. A multiple disc clutch assembly is shown at 170 and it is effective to provide a driving connection between brake drum 152 and clutch member 172, the latter being externally splined to provide a driving connection between alternate discs of the clutch assembly 170 and the brake drum 152 being internally splined for accommodating the other discs of the assembly 170. The clutch member 172 is connected to torque transfer member 174 which in turn is drivably connected to a drive member 176, the latter in turn being secured to sleeve shaft 82. It is thus apparent that the clutch assembly 170 may be energized by the piston 164 as the associated working chamber is pressurized to provide a driving connection between sleeve shaft 82 and sun gear 144.

A positive displacement pump is generally indicated by numeral 178 and it comprises a gear member 180 drivably coupled to power output shaft 150 and situated within a pump chamber defined in part by closure plate 182 secured to a cooperating shoulder formed on the housing 18 by bolts 158. The pump 178, together with the previously described front pump shown at 72 and 74, forms a portion of the automatic control circuit for the basic transmission structure.

A tailshaft housing 184 is secured to housing 18 by bolts 186 and it is adapted to enclose a tailshaft friction brake generally designated by numeral 188. The brake 188 includes a relatively stationary casing 190 secured to the housing 18 by bolts 192 and a multiple disc brake assembly is provided as shown at 194 for anchoring the shaft 150 to the casing 190, said shaft and casing being appropriately splined to accommodate alternately spaced discs of the assembly 194. Casing 190 defines an annular cylinder within which an annular piston 195 is situated, said piston being adapted to energize the multiple brake disc assembly.

Referring next to FIGURES 5 and 6, the blade elements 126 of the secondary turbine exit section are secured in a suitable fashion, such as by projection welding, to a flat 196 formed on pins 124 at a location intermediate the radially inward and outward ends thereof, the radially outward end of pins 124 being received through cooperating openings formed in the inner shroud 50 to provide a support for the same. One pin 124 may be situated in substantial alignment with the exit of each of the blades of the primary section of the secondary turbine 46. The blade elements 126 may be adjusted as illustrated in FIGURE 5 from a first position which is designated by dotted lines to a second position which is designated by full lines.

The blade elements 126 define in part an extension of the fluid flow channels in the secondary turbine assembly and they function to adjust the effective blade exit angle approximately 90°. If it is assumed that the secondary turbine assembly is rotating in the direction of the arrow in FIGURE 5, the direction of the exit fluid velocity vector will be changed so that it will have a forwardly directed tangential component rather than a tangential component which extends in a backward direction. As will subsequently be explained in more particular detail with reference to the vector diagrams of FIGURE 2, this reversal in the exit fluid velocity vector will result in a reversal of the effective torque acting on the secondary turbine which may be utilized to obtain reverse drive operation. The cooperating edges of the blade elements of the primary section of the secondary turbine 46 and the adjustable blade elements 126 are designed so that they are in substantial alignment with a minimum of clearance therebetween when the blade elements 126 assume either of the two positions shown in FIGURE 5.

*Operation of the Transmission Assembly of FIGURE 1*

The transmission mechanism of the instant disclosure is capable of providing a relatively high over-all starting torque ratio and a smooth transition from this initial torque ratio to an over-all normal cruising ratio of unity. The planetary gear unit 16 is capable of providing either of two gear ratios during an operating shift sequence. Driving power is delivered from the engine crankshaft 10 to the torque converter pump 34 and toroidal fluid circulation is thereby established which causes driving torque to be imparted to primary turbine member 40. If the transmission is operated from a standing start, the magnitude of the torque acting on primary turbine member 40 is of a substantial degree relative to the pump torque and the direction of the torus flow vectors is such that the primary turbine 40 tends to rotate in the same direction as the pump 34. However, the blade angularity of the primary turbine 40 and the secondary turbine 46 is such that the toroidal fluid circulation establishes a negative moment of momentum in the region of the secondary turbine 46 under these initial starting conditions and the secondary turbine 46 will therefore tend to rotate in a direction opposite to the direction of rotation of the pump 34 and primary turbine 40. The fluid flow relationship of the primary and secondary turbines is such that the reverse driving torque of the secondary turbine will prevail until the over-all speed ratio reaches a value of approximately 0.3.

During these starting conditions, the friction brake band 160 and the disc clutch assembly 170 are both simultaneously energized and this causes the sun gear 144 to be anchored so that it may serve as a reaction member for the planetary gear unit 16. The multiple disc clutch assembly 170 serves to anchor the secondary turbine 46 since it partly defines a connection between the energized brake band 160 and secondary turbine, the other portions of the torque delivery path for the reaction torque of the secondary turbine being defined by torque transfer member 174, drive member 176, sleeve shaft 82 and hub 52.

The overrunning clutch 84 is ineffective to anchor secondary turbine 46 against reverse rotation and it is thus necessary to utilize the multiple disc clutch 170 for this purpose if reverse rotation is to be prevented. It has been found desirable to prevent such rotation during operation in the low speed ratio range since the over-all starting torque ratio is thereby considerably improved. The secondary turbine functions somewhat as a stationary torque converter reactor during this phase of the operation.

It is contemplated that the automatic control circuit will effect a disengagement of multiple disc clutch assembly 170 after a converter speed ratio of approximately 0.3 is obtained and the torque acting on the secondary turbine 46 will thereafter be in a forward direction. The term "converter speed ratio" may be defined for present purposes as the ratio of the ring gear speed to the engine crankshaft speed. The overrunning clutch 84 is therefore effective to transfer the secondary turbine torque to shaft 88 so that the primary turbine torque will be supplemented by the torque of the secondary turbine 46. Both the primary turbine and the secondary turbine are connected to the common shaft 88 and the combined torques are then transferred through shaft 88 into ring gear 140 of the planetary gear unit 16. The friction brake band 160 is continually applied during this stage of the operation and the sun gear 144 therefore continues to serve as a reaction member. This stage of the operation will hereinafter be referred to as the intermediate speed range.

To effect high speed operation, the multiple disc clutch assembly 170 may again be applied in synchronism with the disengagement of the brake band 160 and the planetary gear unit 16 therefore becomes locked-up to provide a gear ratio of unity. When a hydrokinetic coupling condition is reached, the reactor 56 overruns in a forward direction by reason of the positive torque acting thereon, the one-way brake 60 permitting such an overrunning motion.

To obtain high performance operation of the hydrokinetic portion of the mechanism, the servo defined by the annular cylinder 92 and piston 94 may be actuated to adjustably position the blade elements 106 at the exit section of the blade elements of the pump 34. This produces a higher torque ratio in the hydrokinetic portion of the mechanism although the efficiency is necessarily reduced.

To obtain hill braking during coasting operation, the brake band 160 may be energized to provide a reaction for the sun gear 144 and this causes the ring gear 140 to overspin the power output shaft. This in turn causes the primary turbine 40 to overspin. There is, therefore, a desired amount of hydrokinetic braking to provide the necessary deceleration of the vehicle. The multiple disc brake assembly 194 may be energized under these conditions by pressurizing the annular working chamber behind the piston 195. This mechanical braking action may be controlled by the automatic control circuit in a manner which will subsequently be explained. Provision is made during the operation of the brake assembly 194 for supplying the discs with a sufficient amount of cooling oil to prevent overheating.

To obtain reverse drive operation, reverse brake band 138 may be energized and the friction brake band 160 may be de-energized. Also, the multiple disc clutch assembly 170 is energized to establish a connection between the sun gear 144 and the torque transfer member 174, the latter being connected to the secondary turbine member 46. In addition, the working chamber defined by the annular piston 118 and the cylinder member 110 is pressurized to effect a shifting movement of the blade elements 126 of the secondary turbine member 46. This, as previously mentioned, produces a reverse torque on the secondary turbine member 46 and this reverse torque is transferred through sleeve shaft 82 and through the energized multiple disc clutch assembly 170 to the sun gear 144. The secondary turbine member therefore drives the sun gear 144 in a reverse direction, and since the reverse brake band 138 is energized, as previously explained, the carrier 148 and the associated power output shaft 150 are driven in a reverse direction.

Referring next to the vector representations of FIGURE 2, the fluid flow relationship between the various components of the hydrokinetic portion of the mechanism is illustrated vectorially. The vector diagrams of FIGURE 2 represent the motion of a particle of fluid in the hydrokinetic torus circuit at the exit of each of the converter components. A separate diagram is shown for the stalled condition and for a speed ratio of 0.5 under forward driving conditions. Similarly, vector diagrams are provided for the stalled condition during reverse drive and at a speed ratio of 0.5 during reverse drive. The tangential velocity vector of a point on the various blade elements is represented by the symbol U and the fluid flow velocity component along the blade is represented by the symbol W, the latter being at an angle equal to the angle of the blade elements. The resulting absolute velocity vector is represented in each instance by the symbol V and the vector F represents the fluid flow through the torus circuit in a direction normal to the plane of rotation of the blade elements. The angles of the inlet and exit sections of the various blade elements in the circuit are indicated and this is the preferred geometry although it is possible that deviations may be made therefrom depending upon the performance characteristics which are desired. In the case of the stator exit vectors, the vector component U is absent since the stator is anchored against rotation during the converter phase of the operation and the absolute velocity vector is equal to and coincident with the vector representing the flow along the blade. The torus flow velocity decreases from a maximum at stall to a lesser value at 0.5 speed ratio in both forward and reverse driving ranges and this in turn results in a corresponding decrease in the absolute fluid flow velocity although the direction of the fluid velocity vector remains unchanged.

In the vector diagram for the pump or impeller, the absolute flow velocity vector W is the resultant of the vectors U and V. During forward drive the torus flow velocity vector decreases from a maximum at stall to a lesser value at 0.5 speed ratio and a similar decrease occurs during reverse drive, the effect of this change on the magnitude of the absolute flow velocity being relatively minor. The exit section of the impeller blade elements may be shifted to the performance position designated in FIGURE 2 and this alters the angle of the vector W. However, this change in the direction of vector W has only a minor effect on the vector V since the vector U is substantially increased due to the resulting increase in the pump speed.

The vector diagram for the first turbine exit illustrates the effect of changes in speed ratio upon the absolute velocity vector V as the speed ratio changes. It may be observed that as the speed ratio changes from a stalled condition to 0.5 speed ratio during forward drive, the vector V changes from a backward direction to a forward direction; and as the angularity of the vector V approaches the angularity of the corresponding vector for the impeller exit, the primary turbine torque approaches zero. This is true since the moment of momentum of the fluid which enters the first turbine is equal to the moment of momentum of the fluid leaving the impeller blades and if the change in the moment of momentum for a particle of fluid passing through the first turbine approaches zero, the turbine torque will also approach zero. For purposes of discussion, the moment of momentum of a particle of fluid in the torus circuit can be defined as the mass of that particle multiplied by the tangential component of the absolute velocity vector V multiplied by the radial distance of that particle of fluid from the axis of rotation.

During reverse drive the primary turbine is anchored by reverse brake band 138 and, accordingly, the vector U is lacking in the vector diagrams for reverse operation. It is thus seen that the only change in the absolute velocity vector for the first turbine during reverse drive as the speed ratio changes from zero to 0.5 is due to the change in the magnitude of the torus flow velocity.

Referring next to the vector diagrams for the second turbine exit, it is seen that the angularity of the absolute velocity vector changes rather rapidly as the speed ratio changes. This can be observed by comparing the vector diagram for stall with the vector diagram for 0.5 speed ratio during forward drive wherein the vector V changes from an angle of approximately 135° to an angle of approximtaely 95°.

The moment of momentum of a particle of fluid leaving the first turbine is equal to the moment of momentum of a particle of fluid entering the second turbine and the change in these quantities is a measure of the torque acting on the second turbine. It should be noted that the absolute velocity vector for a stalled condition for forward drive range is substantially equal in magnitude and direction as the corresponding vector for the first turbine. However, since the exit section of the second turbine is situated at a radius which is smaller than the operating radius of the second turbine entrance, a change in the moment of momentum of a particle of fluid passing through the secondary turbine for a stalled condition in the forward drive range is accomplished. It is thus apparent that torque will be imparted to the second turbine in a reverse direction and the second turbine will thus tend to turn in a reverse direction when the converter is conditioned for forward drive and when it is operated at speed ratios near zero. However, as previously explained, the secondary turbine is anchored by the simultaneous engagement of the multiple disc clutch 170 and the friction brake band 160 to prevent such reverse rotation.

It should be further noted that when a speed ratio of 0.5 is obtained during forward drive operation the absolute velocity vector for the first turbine exit and the second turbine entrance will have experienced a substantial change in angularity and the tangential component of the velocity vector will have changed from a reverse direction to a forward direction. It is this change in angularity which results in a change in the direction in which the moment of momentum operates. As previously explained, the multiple disc clutch assembly 170 is de-energized to permit this positive torque of the transmission to be transferred through the overrunning clutch 84 so that it will be added to the torque contributed by the first turbine.

Referring next to the exit velocity vectors for the second turbine during reverse drive, it is apparent that the angularity of vector W has been changed from an angle greater than 90° to an angle less than 90° by reason of the adjustment of the secondary turbine exit blade elements 126 by the associated servo mechanism described in connection with FIGURES 1 and 5. Referring more particularly to the vector representing the stalled condition for reverse drive range, the tangential component of the absolute velocity vector at the primary turbine exit or the secondary turbine entrance has a negative sense so that the change in the moment of momentum of a particle of fluid passing through the second turbine will be very substantial. Since it is negative in character, the secondary turbine tends to rotate in a reverse direction. However, as the speed ratio increases during reverse drive, the angularity of the absolute velocity vector for the secondary turbine exit changes rapidly so that it tends to become aligned with the absolute velocity vector for the primary turbine exit or the secondary turbine entrance. The resulting decrease in the change in moment of momentum for a particle of fluid passing through the secondary turbine is quite large. In the particular embodiment herein described, the absolute numerical ratio of the secondary turbine speed to pump speed during reverse drive is substantially less than the normal cruising speed ratio during direct forward drive.

*Description of the Automatic Control Circuit of FIGURES 3a and 3b*

It is contemplated that the shift sequences previously described may take place automatically in accordance with the operating road requirements. In the particular circuit herein disclosed a "dual driving range" feature is incorporated, although other schematic arrangements may also be employed which do not incorporate such a dual driving range feature but which do embody other characteristics.

During operation in the first forward driving range, the multiple disc clutch assembly 170 is continuously energized and the friction brake band 160 is energized during operation from a standing start until a direct drive is accomplished. The control circuit includes an automatic shift valve responsive to engine throttle setting and to vehicle speed to de-energize the friction brake band 160 when a high speed cruising condition is obtained. This arrangement provides a high degree of smoothness during acceleration from a standing start although it is not the most desirable arrangement from a performance standpoint in certain speed ratio ranges since the simultaneous actuation of the multiple disc clutch assembly 170 and the friction brake band 160 causes the secondary turbine member 46 to remain stationary. At certain speed ratios in the intermediate range the angularity of the blade elements for the secondary turbine member 46 may be unfavorable with respect to the angularity of the absolute fluid velocity vectors in the torus circuit when the secondary turbine is stationary.

The control mechanism as illustrated in the circuit of FIGURES 3a and 3b is also capable of operating in a second drive range in which the multiple disc clutch 170 and the friction brake band 160 may be sequentially operated to provide both an intermediate gear ratio and a high speed gear ratio of unity. The multiple disc clutch assembly 170 and friction brake band 160 are each simultaneously energized between zero speed ratio and approximately 0.3 speed ratio, as previously mentioned, in order to obtain the most desirable performance during the initial stages of acceleration from a standing start.

The control circuit of FIGURES 3a and 3b includes the aforementioned engine driven pump 74 and tailshaft driven pump 178, both of which cooperate to provide a source of control pressure for the circuit. The reverse brake band 138 is energized by a fluid pressure operated servo 196 which includes a piston 198 acting within a cooperating cylinder, a suitable linkage mechanism 200 being provided for transferring the servo forces to the brake band. The piston 198 is urged to a brake released position by return spring 202.

A second brake servo is provided at 204 for operating the low speed friction brake band 160 and it includes a fluid pressure operated piston 206 situated within a servo cylinder, the piston and cylinder for the servo 204 cooperating to define opposed pressure chambers on opposite sides of the piston 206. A piston return spring is provided at 208 for normally urging the piston to a brake de-energized position. Suitable force transmitting means are provided as indicated between the piston 206 and the friction brake band 160.

The fluid pressure operated servo for the multiple disc clutch assembly 170 was previously described in connection with FIGURE 1 and it will be referred to generally in the subsequent description of the control circuit by numeral 210.

A main regulator valve is shown in FIGURE 3a at 212 and it includes a multiple land valve spool having spaced valve lands 214, 216 and 218. The region of the main regulator valve between valve lands 214 and 216 communicates with control pressure passage 220 which in turn is connected to control pressure passage 222 extending to the discharge side of the tailshaft driven pump 178. Passage 220 also communicates with the discharge side of the engine driven pump 74 as indicated. Another passage 224 extends from the discharge side of the engine driven pump 74 to the main regulator valve at a location adjacent valve land 218, the latter being adapted to control the degree of communication between passage 224 and a low pressure exhaust passage 226 communicating with a transmission sump. Similarly, valve land 216 controls the degree of communication between passage 220 and the exhaust passage 226.

The regulator valve element is biased in a downward direction as indicated in FIGURE 3a by a valve spring 228 and this spring force is opposed by a fluid pressure force acting on a valve plunger 230 which is adapted to engage the lower end of the regulator valve element. Valve plunger 230 is pressurized by means of a branch passage 232.

The discharge side of pump 74 communicates with plunger 230 through a one-way check valve 234 and a second one-way check valve 236 is situated as indicated in FIGURE 3b between the discharge side of the tailshaft driven pump 178 and passage 222. When the vehicle is operating at low vehicle speeds and when the vehicle is stopped with the engine running, the discharge pressure of the tailshaft driven pump 178 is either zero or is reduced in magnitude relative to the discharge pressure for pump 74. It is thus apparent that check valve 236 will be closed under these conditions and check valve 234 will be open because of differential pressure. Fluid pressure is thus entirely supplied by the pump 74 through passages 220 and 224. The valve land 216 will block communication between passage 220 and exhaust passage 226 under these conditions and the valve land 218 provides necessary pressure regulation by appropriately controlling the degree of communication between passage 224 and exhaust passage 226, the balanced forces acting on the regulator valve being provided by spring 228 and spring pressure force on plunger 230.

After the vehicle speed begins to increase, the tailshaft driven pump pressure increases relative to the pump discharge pressure of pump 74 and under certain conditions it will exceed the discharge pressure for pump 74. For example, during coasting or during a push start the check valve 234 will close and check valve 236 will be opened, and the rear tailshaft driven pump 178 will then form the pressure source for the control circuit. Under these conditions the valve land 216 provides the necessary pressure regulation by controlling the degree of communication between passage 220 and exhaust passage 226 and this results in a shifting movement of the valve spool in an upward direction. The discharge from pump 74 is thereafter passed directly from passage 224 into the exhaust passage 226 since valve land 218 is moved to an inoperative position. Pump 74 therefore operates under a minimum pressure thus reducing pumping horsepower loss and increasing the over-all mechanical efficiency.

An operator controlled manual valve is shown at 238 and it includes a valve spool with spaced valve lands 240 and 242 slidably disposed in a cooperating valve chamber. The portion of the valve chamber between valve lands 240 and 242 communicates directly with control pressure passage 222 by another control pressure passage 244. As schematically illustrated, the valve element for the manual valve 238 may be adjusted to either of five operating positions designated in FIGURE 3a by the symbols R, N, D, $D_s$ and HB which respectively correspond to a reverse drive range position, a neutral position, a first drive range position, a second drive range position and a hill brake position.

The position of the various valve elements illustrated in FIGURES 3a and 3b correspond to the first drive range position in which the multiple disc clutch assembly 170 is continuously engaged throughout the shift sequence as the vehicle accelerates from a standing start to a steady state cruising condition. The servo 210 for the multiple disc clutch assembly 170 is pressurized by means of a passage 246, a hill hold valve 248, a passage 250, a shuttle valve 252, passage 254 and passage 256, the latter communicating with the pressurized portion of the manual valve chamber. The hill hold valve 248 includes a multiple land valve spool 258 which is spring urged in a left-hand direction as viewed in FIGURE 3b, and when it is in the position shown it provides free communication between passages 246 and 250. The aforementioned shuttle valve 252 includes a single valve plunger 260 and it is urged in a left-hand direction as indicated during operation in the first drive range under the influence of control pressure to permit free communication between passages 254 and 250.

A low servo shift valve is generally identified by numeral 262 and it includes a multiple land valve spool 264 and a valve plunger 266. The plunger 266 and the valve spool 264 are situated in separate portions of a cooperating valve chamber which are separated by a separating element 268. A force transmitting stem 270 is interposed between the plunger 266 and the valve element 264 and it is adapted to slide freely in a separating element 268. The valve 264 includes three spaced valve lands 272, 274 and 276 and it is urged in a left-hand direction by a valve spring as indicated.

During operation in the low speed ratio range while the manual valve is in the first drive range position, the valve element 264 and plunger 266 will assume a left-hand position under the influence of the valve spring and communication is thus established between passage 254 and passage 278, the latter extending to the apply side of the low speed servo 204. An orifice control valve 280 is situated in passage 278 and partly defines passage 278. The orifice control valve 280 includes a valve element having spaced valve lands which is normally urged in a downward direction by an associated valve spring. But when the valve element assumes the position shown, free communication is established therethrough. When the orifice control valve element assumes a downward position, a first branch portion 282 of the passage 270 is blocked by the upper valve land and a second branch passage portion 284 is uncovered by the lower valve land, the latter branch passage portion having a flow restricting orifice 286. It is thus apparent that free communication through the orifice control valve is interrupted and a fluid flow restriction is introduced in the passage 270 when the valve element therefor is moved in a downward direction.

The orifice control valve is subjected to a pressure signal which is sensitive to engine throttle movement and this pressure signal, which will hereinafter be referred to as throttle pressure, acts on the lower end of the orifice control valve element and normally biases the same in an upward direction whenever the same is under torque. This same throttle pressure acts on the differential pressure areas of spaced valve lands 272 and 274 of the low servo shift valve 262 to urge the same in a left-hand direction to supplement the action of the low servo shift spring.

The valve actuating forces acting on the low servo shift valve element 262 in the left-hand direction are opposed by a vehicle speed sensitive pressure signal acting on the left end of valve plunger 266. This speed signal will hereinafter be referred to as governor pressure and the portion of the circuit which produces this governor pressure, as well as the portion of the circuit which produces the throttle pressure, will subsequently be fully explained.

At stall and at lower vehicle speeds, the low servo shift valve element will assume a left-hand position and free communication will be established between passage 254 and passage 278. The low speed servo will thus become energized. The transmission is then conditioned for acceleration from a standing start since both the multiple disc clutch assembly 170 and the low speed servo 204 are simultaneously energized. When the vehicle speed increases, the magnitude of the governor pressure force will correspondingly increase and at a certain shift point the valve element 264 will be urged in a right-hand direction as viewed in FIGURE 3a. The apply side of the low speed servo 204 will then be exhausted through passage 278 and through an exhaust port in the low servo shift valve chamber. The multiple disc clutch assembly 170 continues to be energized following this shift and the transmission will thereafter operate in a cruising, direct drive ratio.

A throttle valve mechanism is generally designated in FIGURE 3a by numeral 288 and it includes a valve spool 290 having spaced valve lands thereon and a hollow valve element 292. Another valve element 294 is telescopically received within valve element 292. A valve spring 296 is interposed between valve elements 292 and 294 and a snap ring 298 is provided for limiting the amount of relative movement between the two valve elements. Another valve spring is interposed between valve element 294 and valve spool 290. The valve element 292 is connected to the engine throttle by a suitable mechanical linkage so that the engine throttle will cause a corresponding movement of the valve element 292. When the engine throttle is advanced, spring 300 becomes compressed and the biasing force acting on valve spring 296 is correspondingly increased.

The valve chamber for valve spool 290 communicates with control pressure passage 244 by means of passage 302 and a throttle pressure passage 304 also communicates with the chamber for the valve spool 290 at a location intermediate the spaced valve lands. The valve spool 290 controls the degree of communication between passages 302 and 304 so that the biasing forces acting in a right-hand direction on the valve spool 290 will tend to increase the degree of communication between passages 302 and 304 thereby tending to increase the magnitude of the resulting throttle pressure in passage 304. Throttle pressure also is caused to act on the right-hand side of valve element 290 and, if desired, a suitable secondary valve spring may be provided at that location. The force of the throttle pressure acting on the right side of the spool valve 290 thus balances the biasing force of spring 300.

The throttle pressure thus produced in passage 304 is conducted to the low servo shift valve and the orifice control valve as previously explained.

Throttle pressure is also conducted to a main shift valve generally designated by numeral 306. This main shift valve comprises a multiple land valve spool 308 slidably situated in a cooperating valve chamber. The valve spool 308 is biased in a left-hand direction as shown in FIGURE 3b by valve springs 310 and 312. A throttle pressure modulator valve element 314 is situated at one end of the shift valve chamber and the aforementioned valve spring 312 acts directly thereon to urge the same in a right-hand direction. Throttle pressure is caused to act on the right side of plunger 314 and when the shifted valve spool 308 is in a left-hand position, the valve element 314 operates to regulate communication between passage 304 and a modulated throttle pressure passage 316, said passage 316 communicating with the right-hand side of the valve chamber for valve spool 308 within which springs 310 and 312 are situated. Modulated throttle pressure also is caused to act on a differential area formed by valve lands 318 and 320 on the valve spool 308 for urging the latter in a left-hand direction. When the manual valve assumes the first drive range position as illustrated, control pressure does not communicate with the valve chamber for valve spool 308 and the main shift valve is inoperative although it may be caused to shift under the influence of the opposing forces established by the modulated throttle pressure and by the governor pressure. Governor pressure is caused to act on the left end of valve spool 308 thereby establishing a pressure force which is proportional to vehicle speed and which acts on the shift valve spool in a right-hand direction.

Governor pressure is obtained in the particular embodiment herein disclosed by means of the tailshaft driven pump 178, although it is contemplated that other governor pressure sources may also be used. The pump 178 is formed with two working regions, one of which pressurizes control pressure passage 222 and the other of which pressurizes a governor pressure passage 322.

The by-pass passage 324 interconnects governor pressure passage 322 and the transmission sump and it contains a flow restricting orifice 326. The orifice 326 is capable of creating a back pressure in passage 322 which is a measure of pump speed. Passage 322 in turn communicates with the passage 328 which delivers governor pressure to the left side of the low servo shift valve 262 and the main shift valve 306, as previously mentioned, to provide the necessary vehicle speed signal for establishing shift points.

A compensator valve is shown in FIGURE 3a at 330 and it is capable of appropriately modifying the operating control pressure level in accordance with vehicle speed and engine torque. Compensator valve 330 includes a valve spool 332 operating in a cooperating valve chamber and a compensator valve spring 334 is situated in the valve chamber for biasing the valve spool 332 in a right-hand direction as viewed in FIGURE 3a. Control pressure is distributed to the compensator valve chamber through a branch passage 336 at a location intermediate valve lands 338 and 340 on the compensator valve spool 332. A compensator pressure passage 342 communicates with the compensator valve chamber at a location adjacent valve land 340 and it extends to the main regulator valve 212 at a location adjacent valve land 214. The compensator pressure in passage 342 is capable of exerting an upwardly directed force on the main regulator valve spool in opposition to the force of spring 228. Valve land 340 of the compensator valve controls the degree of communication between branch passage 336 and compensator passage 342.

Throttle pressure is distributed to the right-hand side of the valve spool 332 through the passage 343 which communicates with passage 304 through a low boost valve generally identified by numeral 344. This valve 344 will be subsequently described. Also, governor pressure is distributed to the compensator valve chamber on the left side of the valve spool 332 by means of a passage 346 which communicates with the previously mentioned governor passage 328 through the low boost valve 344. The throttle pressure and governor pressure therefore establish opposed forces which influence the degree of communication between passages 336 and 343 that is provided by valve land 340. An annular working area is formed on the valve spool 332 at the right-hand side of valve land 340 and compensator pressure passage 342 therefore establishes a valve biasing force which tends to reduce the degree of communication between passages 336 and 342. The force differential produced by the governor pressure and by the throttle pressure, the force of the spring 228 and the valve biasing force of the compensator pressure produce a balanced force system and it is thus apparent that the magnitude of the compensator pressure in passage 342 will be a function of both engine throttle setting and vehicle speed. For example, if the vehicle speed should increase for any given engine throttle setting, the degree of communication between passages 336 and 342 will increase thereby increasing the compensator pressure force acting on the lower end of the main regulator valve spool. This tends to decrease the magnitude of the control pressure in the circuit which in turn reduces the capacity of the fluid pressure operated servos to a value which is commensurate with the reduced torque requirements. It is pointed out that an increase in vehicle speed for any fixed engine throttle setting is tantamount to an increase in the over-all speed ratio and to a decrease in over-all torque ratio. The relationship between speed ratio and torque ratio can be readily calculated.

Conversely, if the engine throttle setting is increased for any given vehicle speed, the compensator pressure will be decreased and the compensator pressure force acting on the main regulator valve spool will also be decreased. This produces an increase in the operating control pressure and the capacity of the transmission servos is correspondingly increased to accommodate the increased torque requirements which accompany the adjusted engine throttle setting.

It is undesirable to allow the compensator pressure to become increased for any given throttle setting after a certain limiting speed is obtained. Otherwise, the operating control pressure will be reduced at high cruising speeds to a value which is insufficient to maintain the required torque capacity of the transmission servos. For this reason a governor pressure cut-out feature is provided in the compensator valve and this includes the valve plug 346 situated adjacent the compensator valve spool 340 and it is provided with spaced valve lands for defining a differential working area 348, said working area being in fluid communication with branch passage 336 so that it is subjected to line pressure. The fluid pressure force of the line pressure is opposed by a pressure force established by governor pressure, the latter acting on the right-hand side of valve plug 346. A spacer element 350 is movably disposed between valve spool 332 and valve plug 336.

During operation of the transmission at lower vehicle speeds, the governor pressure is insufficient to establish a force on valve plug 346 which will overcome the opposing pressure force of the line pressure acting thereon and the valve plug 346 will be urged in a right-hand direction so that it is inoperative. However, as vehicle speed increases for any given throttle setting, a point is reached at which the governor pressure will overcome the opposing force of the control pressure acting on valve plug 346 and the plug 346 will be urged in a left-hand direction. The force differential acting on the plug 346 will then be transferred directly to the valve spool 332 through the spacer element 350. The area of plug 346 upon which governor pressure acts is equal to the area of the valve spool 332 on which the governor pressure acts and further increases in governor pressure will create balanced and opposed forces on the valve spool 332. The compensator valve will thereafter be insensitive to changes in vehicle speed and further changes in control pressure below a safe minimum value will therefore not occur.

Let it now be assumed that the manual valve 238 is adjusted to the second drive range position $D_s$. A passage 352 will then be uncovered by valve land 242 and the exhaust port in the manual valve chamber, through which passage 352 was previously exhausted, is now closed by valve land 242. Passage 352 will therefore be subjected to control pressure and it distributes this control pressure to a communicating passage 354 which extends to the main shift valve chamber. Passage 352 also extends to a passage 356 which in turn communicates with the left end of the valve spool for a blocker valve 358. The right hand end of the valve spool for blocker valve 358 is also subjected to line pressure by means of passage 360 which in turn communicates with the previously described pressurized passage 254. A blocker valve spring is disposed on the left side of the blocker valve spool and when passage 356 is pressurized, the valve spring urges the blocker valve spool in a right-hand direction. When this occurs communication is established through the blocker valve by the governor pressure passage 328 and the passage 362, the latter extending to the left-hand side of valve spool 258 for the hill hold valve 248. During operation in the first drive range position, the blocker valve is maintained in a left-hand position under the influence of control pressure acting on the right-hand side thereof and the passage 362 is continuously exhausted through an exhaust port associated with the blocker valve chamber.

The hill hold valve is comprised of three spaced valve lands identified by numerals 364, 366 and 368 and it is urged in a left-hand direction by a valve spring 370. It is thus apparent that the valve biasing force established by the governor pressure will oppose the spring biasing force and when the governor pressure exceeds a calculated value, the hill hold valve spool will shift in a right-hand direction so that valve land 364 will block passage 250 and thereby establish communication between passages 246 and the passage 372 between the spaced valve lands 364 and 366. Passage 372 in turn extends to the fluid pressure chamber on the release side of the piston 206 of the low speed servo 204. Passage 372 also communicates with the manual shift valve chamber at a location between spaced valve lands 374 and 376 on the main shift valve spool.

Passage 362 is also in communication with the hill hold valve chamber adjacent the valve land 368 and when the hill hold valve spool is shifted in a right-hand direction under the influence of governor pressure, the differential area provided by valve lands 366 and 368 is subjected to governor pressure and a snap action occurs whereby the hill hold valve spool is shifted quickly in a right-hand direction as soon as valve land 368 uncovers the associated branch portion of passage 362.

During operation in the second drive range, control pressure is conducted to the right-hand end of the low servo shift valve spool 264 and to the right-hand end of valve plunger 266. Valve spool 264 is therefore shifted in a left-hand direction, thereby establishing fluid communication between passage 254 and passage 278. Valve plunger 266 remains inoperative since the governor pressure is insufficient to overcome the opposing force of the line pressure acting on plunger 266. It is thus apparent that the low servo shift valve remains in a left-hand position during operation in the second drive range and is insensitive to changes in vehicle speed.

If it is now assumed that the vehicle is operated from a standing start with the manual valve adjusted to the $D_s$ position, the servo 210 and the apply side of the brake servo 204 will be simultaneously energized during the initial stage of the shift sequence thereby providing for maximum torque multiplication in the hydrokinetic portion of the transmission mechanism. The release side of the servo 204 is exhausted through passage 372 and through a communicating passage 378 which extends to an exhaust port located in the main shift valve chamber. After the vehicle begins to accelerate, the governor pressure will urge the hill hold valve spool in a right-hand direction against the opposing force of the spring 370 to establish communication between passage 246 and passage 372, and the clutch servo 210 is therefore exhausted through the hill hold valve and through passage 372, passage 378 and the main shift valve exhaust port. Simultaneously with this shifting movement of the hill hold valve spool, valve land 264 blocks passage 250. The transmission is thus conditioned for an intermediate driving torque ratio and both the primary and secondary turbines are operative to deliver torque to the ring gear 140 of the planetary gear unit 16, the torque of the primary turbine being transferred to the secondary turbine through the overrunning clutch 84 as previously explained. The low speed friction brake band 160 continues to anchor the sun gear 144 of the planetary gear unit 16 to provide the necessary torque reaction.

When the vehicle continues to accelerate during operation in the second drive range for any given engine throttle setting, the governor pressure will ultimately increase to a value which will be sufficient to urge the main shift valve spool in a right-hand direction against the opposing force of valve spring 310 and the modulated throttle pressure forces acting on the main shift valve spool. This position of the main shift valve spool is illustrated in FIGURE 3b, and when it is in this position communication is established between passage 354 and passage 378 and the main shift valve exhaust port is no longer in communication with passage 378, the release side of the low speed servo therefore being pressurized. As previously explained, the appply side of the servo 204 is also pressurized, but since the servo spring 208 normally urges the piston to a retracted position, the low speed servo becomes released under spring pressure.

Since passage 372 communicates with passage 246 through the up-shifted hill hold valve element, the passage 246 and the clutch servo 210 become pressurized following an up-shift of the main shift valve element and the planetary gear unit 16 therefore assumes a locked-up condition. The transmission is thus conditioned for cruising, direct drive operation.

If hill braking is desired, the manual valve may be shifted to the HB position and this causes the passage 378 to become uncovered by manual valve land 242 and the associated exhaust port for passage 378 is simultaneously closed by this same valve land. Passage 378 communicates with passage 380 which in turn communicates with a passage 382 through the throttle valve chamber, a suitable groove 384 being provided in the valve element 292 for this purpose. Line pressure in thus conducted to the left-hand side of the blocker valve generally shown at 386, thereby shifting the same in a right-hand direction against the opposing force of a blocker valve spring. The blocker valve thereby blocks passage 352. The passage 372 establishes communication between passage 254 and passage 352 so that the latter continues to be pressurized with control pressure. Passage 382 also extends to the main shift valve chamber and distributes control pressure to the right end of the main shift valve spool and to the differential area provided for the valve lands 318 and 320 to shift the main shift valve spool in a left-hand downshift position. Communication is thus established between passage 380 and a passage 388 which in turn extends to the left-hand side of the low boost valve 344 to urge the latter against an opposing spring force to a right-hand position. This interrupts communication between passages 328 and 345 and simultaneously exhausts passages 340 and 345 through the associated exhaust port. In addition, the low boost valve establishes communication between passage 342 and a converter pressure passage 390, said passage 390 extending to the interior of the hydrokinetic torus circuit. When the low boost valve is shifted in the right-hand direction in this fashion, the governor pressure acting on the left-hand side of the compensator valve spool is exhausted and the throttle pressure which acts on the right-hand side of the compensator valve spool is replaced by a relatively high converter pressure. Both of these pressure changes result in an increased biasing effect on the compensator valve spool in a left-hand direction which tends to decrease the degree of communication between passages 336 and 342, and this in turn results in a decrease compensator pressure. This decreased compensator pressure in turn results in an increased control pressure in the circuit and the capacity of the brake servo 204 will accordingly be increased. The increased line pressure will prevent slippage during a coasting operation and although the friction brake band 160 is self-energizing for torque delivery during normal forward driving, the brake capacity is still sufficient during delivery of torque in a reverse direction during coast even though the self-energizing feature of the brake band is lacking.

It is thus apparent that the release side of the low speed servo 204 will be exhausted through the main shift valve exhaust port and that the low speed servo will become applied. This anchors the sun gear of the planetary gear unit 16 to cause an overspeeding of the ring gear 140 of the primary turbine member 40.

The blocker valve 358 continues to establish communication between passages 328 and 362 to distribute governor pressure to the left-hand side of the valve spool of hill hold valve 48 and when the main shift valve is downshifted as above described, the clutch servo 210 is exhausted through the passage 246, through the hill hold valve and through passages 372 and 378, the latter communicating with the main shift valve exhaust port. As deceleration continues to a point where the governor pressure is insufficient to maintain the hill hold valve in the up-shift position, the hill hold valve spool will be shifted to the position shown in FIGURE 3b and the clutch servo 210 will again be energized so that both the servos 210 and 204 are simultaneously energized. The secondary turbine member 46 is anchored during this stage of the hill braking optration.

Additional hill braking may be obtained by the multiple disc brake assembly 194. The automatic controls for this brake assembly includes a retarder activator valve 392 which comprises a simple valve spool biased in one direction by a valve spring and in another direction by throttle pressure which is distributed thereto by a passage 304. When the valve spool for the retarder activator valve 392 assumes the position shown, communication is established between the aforementioned passage 254 and a passage 394. However, during a coasting operation the throttle valve pressure drops to zero and the retarder activator valve spool assumes a right-hand position, thereby connecting the aforementioned governor pressure passage 328 with passage 394. Passage 394 in turn extends to one side of a retarder clutch valve, identified by numeral 396, which comprises a simple valve spool normally urged in a left-hand direction by an associated valve spring. A line pressure passage 398 communicates with the valve chamber associated with the retarder brake valve spool and when the valve spool is positioned as shown in FIGURE 3b, the passage 398 is blocked. However, when the retarder brake valve spool assumes a left-hand position, passage 398 communicates with a passage 400. During normal driving operation, the throttle pressure is sufficient to maintain the retarder activator valve spool in a left-hand position and the retarder brake valve is thus continuously urged in a right-hand position under the influence of control pressure. However, during coasting position the retarder activator valve will move under spring pressure in a right-hand direction thereby pressurizing the retarder brake valve spool with governor pressure rather than control pressure. At relatively high speeds the governor pressure is sufficient to maintain the retarder brake valve in the position shown. However, after the vehicle accelerates below a calculated speed, the retarder brake valve will shift in a left hand position thereby establishing communication between line pressure passage 398 and passage 400, the latter in turn extending to the retarder brake disc lubrication jets 402. When the retarder brake valve spool is shifted in this fashion in a left-hand direction, communication is established between a passage 404 and a passage 406, the latter extending to the servo for the brake assembly 194 which is partly defined by piston 195. Passage 404 is pressurized with the modulated retarder pressure obtained by means of a retarder pressure regulator valve identified by numeral 408. Valve 408 comprises a valve spool operating in an associated valve chamber which communicates with control pressure passage 254. The retarder regulator valve spool is urged in a right-hand direction by valve spring 410 and the biasing effort of valve spring 410 tends to increase the degree of communication between passage 254 and passage 404. The right side of the retarder regulator valve spool is in communication with passage 404 so that the spring force is opposed by the modulator pressure force in passage 404. It is thus apparent that the magnitude of the modulated pressure made available to the multiple disc retarder brake assembly 194 will be determined by the calibration of the retarder regulator valve.

If a forced "kickdown" is desired following cruising, direct drive operation, the valve element 292 may be urged to the extreme right position by depressing the accelerator pedal which moves the engine throttle to its extreme position. When this is done a port 412 in the valve element 292 is brought into communication with the branch passage 414 extending from throttle pressure passage 304. This then admits throttle pressure into the interior of valve element 292 on one side of the associated valve element 294, suitable passages 416 being provided for this purpose. Continued movement of the valve element 292 to a downshift position will cause contact between a shoulder 418 on the control valve body and an abutment 422 on the valve element 294. As the valve element 292 moves further, relative movement will then take place between valve elements 294 and 292 and this relative movement is resisted by the throttle pressure which exits in the interior of valve element 292. The vehicle operator therefore experiences what may be referred to as a fluid detent feel which permits him to determine readily when a downshift will be initiated. This also prevents an inadvertent downshift by the vehicle operator when it is not desired. Finally, as the valve element 292 is moved to a final position against the opposing fluid pressure force of the throttle pressure, passage 382 is brought into fluid communication with the interior of valve element 292 and with passage 414. This occurs when a valve port 420 is uncovered by the associated valve land on valve element 294. Simultaneously with the uncovering of port 420, valve element 292 blocks passage 380 so that the pressurized passage 382 will not be exhausted therethrough. After the valve element 292 has assumed this ultimate position, the magnitude of the throttle pressure is equal to control pressure and this control pressure is conducted to one side of the main shift valve spool through passage 382, thereby shifting the same in a left-hand direction to effect a downshift. The release side of the brake servo 204 is exhausted through passage 372 and passage 378 after a downshift occurs and since the apply side of the servo 204 continues to be pressurized, the brake band 160 will be energized.

Concurrently with the application of brake band 160, clutch servo 210 is exhausted through passage 246, through the upshifted hill hold valve 248 and through passages 372 and 378. The blocker valve 386 assumes a right-hand position during a downshift since the left-hand side of the blocker valve element is pressurized. Communication is thus established between control pressure passage 254 and control passage 352 so that the latter continues to be pressurized with control pressure.

Referring next to the adjustable pump exit feature previously mentioned, the automatic controls therefor may be seen in FIGURE 3a and they include a first performance valve 424 and a second performance valve shown at 426. The servo for the adjustable blade elements 106 of the pump exit section is pressurized when the blade elements are in the normal cruising position and spring means are provided for returning the blade elements to a high performance position when the pressure is released. The selective distribution of fluid pressure to the pump exit servo is controlled by the performance valves 424 and 426.

Referring first to valve 424, it comprises a simple valve spool which is spring urged in an upward direction and which is urged in a downward direction by throttle pressure distributed thereto through the passage 304. When the valve assumes a downward position, communication is established between line pressure passage 244 and a passage 428 extending to the servo for the pump exit section. The lower end of the valve spool for performance valve 424 communicates with passage 380 which is pressurized when the manual valve is shifted to the HB position. When the valve spool for performance valve 424 assumes an upward position under the influence of control pressure, communication between passages 244 and 428 is established and the pump exit servo is pressurized. The pump may be conditioned for high performance by increasing the engine throttle setting, which results in an increase in throttle pressure and this in turn causes the performance valve 424 to assume the high performance position.

The second performance valve 426 comprises a simple valve spool which is normally urged in a downward direction by converter pressure and which is urged in an upward direction by governor pressure distributed into the passage 328. At relatively high vehicle speeds the governor pressure is sufficiently high to move the valve spool for the second performance valve 426 in an upward position and this causes an interruption between performance valve 424 and passage 380. Concurrently, however, control pressure passage 254 communicates with the lower end of valve 424 so that a downshift resulting from kick down pressure cannot be accomplished at an undesirably high vehicle speed. The converter pressure passage 390 may be regulated by a simple converter pressure regulator valve identified by numeral 430. Valve 430 comprises a simple valve spool spring urged in an upward direction against the fluid pressure force of the converter pressure acting on the upper end thereof. The balanced spring and pressure forces on the regulator valve element control communication between the line pressure passage 432 and the aforementioned converter pressure passage 390 to establish a reduced operating pressure level in the hydrokinetic torus circuit of the mechanism.

A lubrication pressure regulator valve is identified by numeral 433 and it comprises a simple valve spool 434 having spaced valve lands, one of which is adapted to control the degree of communication of line pressure passage 432 with a lubrication pressure passage 436. The valve spool 434 is urged in a left-hand direction as viewed in FIGURE 4a by a valve spring 438 and this spring force is opposed by the fluid pressure force of the lube pressure in passage 436 which is distributed to the left-hand side of valve spool 434. It is thus apparent that the regulator pressure in passage 436 will be reduced in magnitude and will be determined by the calibration of the regulator valve 433.

A valve plunger 440 is situated in the valve chamber for valve spool 434 and the valve spring 438 is seated thereon as indicated. A passage 442 communicates with the end of the valve chamber for regulator valve 433 and it also communicates with the manual valve at a location which is spaced from the valve lands 240 and 242. Passage 442 also communicates with reverse brake band servo 196 for the purpose of distributing control pressure to one side of the piston 198.

To obtain reverse drive operation, the manual valve may be shifted to the position indicated by the symbol R and this causes the passage 442 to communicate directly with line pressure passage 244 through the spaced valve lands 240 and 242. Reverse brake servo 196 therefore becomes pressurized and control pressure is also distributed to one side of the plunger 440 of the regulator valve 442. This causes the valve spool 444 to move in a left-hand direction to bring passages 432 into communication with passage 436, thereby pressurizing the working chamber defined by the servo cylinder member 110 and the annular piston 118 of the secondary turbine member. The annular piston 118 is therefore shifted in a left-hand direction to rotate the blade elements 126 to a reverse position illustrated by means of full lines in FIGURE 6, thereby adapting the secondary turbine for reverse torque delivery. During normal forward driving operation, the blade elements 126 are maintained in a forward driving position illustrated in FIGURE 5 by dotted lines by reason of the torque exerted thereon by the torus flow.

When passage 442 is pressurized in this fashion, control pressure is distributed to the left side of the aforementioned shuttle valve 252, thereby blocking communication between passages 250 and 254. This prevents fluid pressure in the reverse servo from being exhausted through passage 256 which becomes uncovered by the valve land 242 of the manual valve when the manual valve spool is moved to a reverse drive position.

Passage 442 also distributes control pressure to the left-hand side of valve plug 346 of the compensator valve and the spacer element 350 is subjected to control pressure. The control pressure force acting on spacer element 350 is transmitted directly to the compensator valve spool 332 to oppose the governor pressure force acting on the other end of the valve spool 332. The magnitude of the compensator pressure passage 442 is thereby decreased by reason of this rearrangement of forces acting on compensator valve spool 332 and, as previously explained, this results in an increase in the magnitude of the control pressure. This increase in control pressure is necessary since the capacity of the reverse servo must be sufficient to accommodate a reverse driving torque.

In addition to this variation in the servo capacity during reverse drive, the capacity of the low servo and the forward drive clutch servo during forward drive operation may be varied in accordance with engine throttle setting upon movement of the engine throttle from a closed position to a setting of approximately 60% of the wide open position. The engine torque is generally proportional to throttle setting in this range of settings, but movement of the engine throttle beyond this range is not accompanied by a significant increase in engine torque. Provision is therefore made for making the throttle valve insensitive to throttle movement at increased settings and this is done by adapting the throttle valve so that abutment 422 contacts shoulder 418 when the limiting engine throttle setting is reached. Further increases in engine throttle setting will therefore not affect throttle pressure. This feature, together with the aforementioned governor pressure cut-out feature in the compensator valve, insures a smooth shift under all driving conditions.

We contemplate that variations in the preferred embodiment of our invention herein disclosed will come within the scope of our invention as defined by the following claims.

We claim:

1. In a power transmission mechanism, a driving member, a driven member, a gear unit having one portion thereof connected to said driven member, a hydrokinetic unit comprising a pump member and a turbine member situated in toroidal fluid flow relationship, said pump member being connected to said driving member and said turbine member being connected to another portion of said gear unit, said turbine member having flow directing blades disposed in spaced relationship about an axis of rotation for said turbine member, said blades being arranged in two sections, one section being situated at the turbine fluid flow entrance region and the other being situated at the turbine fluid flow exit region, means for adjustably positioning the blades of one section thereby altering the relative angular relationship between the fluid flow velocity vectors at entrance and exit regions of said turbine member, said turbine member being adapted to deliver a forward driving torque to said driven member through said gear unit when said sections assume one relative angular relationship and to deliver a reverse driving torque to said driven member through said gear unit when said sections assume another relative angular relationship.

2. In a power transmission mechanism, a driving member, a driven member, a gear unit comprising a sun gear element, a ring gear element, a carrier element and planet gears carried by said carrier element in meshing engagement with said sun and ring gear elements, means for drivably connecting one element of said gear unit to said driven member, brake means for anchoring a second element of said gear unit to provide a torque reaction, a hydrokinetic unit comprising a pump member, a primary turbine member and a secondary turbine member, said pump and turbine members being disposed in fluid flow relationship, said pump member being connected to said driving member, means for transmitting the torque of each of said turbines to said gear unit during forward drive operation and brake means for anchoring one of said turbine members to obtain reverse drive operation whereby a reverse driving torque is imparted to the other turbine member and transmitted to an element of said gear unit.

3. In a power transmission mechanism, a gear unit comprising a sun gear member, a ring gear member, a carrier member and planet gears mounted on said carrier member in meshing engagement with said sun and ring gear members, a first member of said gear unit being connected to driven portions of said mechanism, the hydrokinetic unit comprising a pump member, a primary turbine member and a secondary turbine member situated in fluid flow relationship, means for transmitting the torque of each turbine member through said gear unit to said driven portions during forward drive operation, brake means for anchoring a second member of said gear unit to absorb the forward driving torque reaction, and additional means for braking one turbine member and one member of said gear unit to obtain reverse drive operation, the torque acting on the other turbine member being reversed in direction when said additional brake means is actuated, said gear unit being effective to transmit the reverse driving torque of said other turbine member to said driven portions during reverse drive operation.

4. In a power transmission mechanism, a gear unit comprising a sun gear member, a ring gear member, a carrier member and planet gears mounted on said carrier member in meshing engagement with said sun and ring gear members, a first member of said gear unit being connected to driven portions of said mechanism, a hydrokinetic unit comprising a pump member, a primary turbine member and a secondary turbine member situated in fluid flow relationship, means for transmitting the torque of each turbine member through a common torque delivery path defined in part by said gear unit to driven portions of said mechanism during forward drive, brake means for anchoring a second member of said gear unit to absorb the forward driving torque reaction, and additional brake means for braking said primary turbine member and a third member of said gear unit to condition said mechanism for reverse drive operation, the torque acting on the secondary turbine member being reversed in direction when said additional brake means is actuated, said gear unit being effective to transmit the reverse driving torque of said turbine member to said driven portions during reverse drive operation.

5. In a power transmission mechanism, a gear unit comprising a sun gear member, a ring gear member, a carrier member and planet gears mounted on said carrier member in meshing engagement with said sun and ring gear members, a first member of said gear unit being connected to driven portions of said gear unit, a hydrokinetic unit comprising a pump member, a primary turbine member and a secondary turbine member situated in fluid flow relationship, means for positively connecting the primary turbine member to a second member of said gear unit, overrunning clutch means forming a one-way driving connection between said secondary turbine and said second member of said gear unit whereby both turbine members are effective to drive said second member of said gear unit during forward drive operation, brake means for anchoring a third member of said gear unit to absorb the forward driving torque reaction, and additional brake means for braking said primary turbine member and said second member of said second gear unit to obtain reverse drive, clutch means for connecting said secondary turbine member to said third member of said gear unit during reverse drive, the torque acting on the secondary turbine member being reversed in direction when said additional brake means is actuated, said gear unit being effective to transmit the reverse driving torque of said secondary turbine member to said driven portions.

6. In a power transmission mechanism, a driving member, a driven member, a gear unit comprising a sun gear element, a ring gear element, a carrier element and planet gears mounted on said carrier element in meshing engagement with said sun and ring gear elements, means for drivably connecting one element of said gear unit to said driven member, brake means for anchoring a second element of said gear unit to provide a torque reaction, a hydrokinetic unit comprising a pump member, a primary turbine member and a secondary turbine member, said pump and turbine members being disposed in fluid flow relationship, said pump member being connected to said driving member, means for connecting said primary turbine member to an element of said gear unit, overrunning clutch means for forming a one-way driving connection between said secondary turbine member and said primary turbine member during forward drive operation, brake means for anchoring said primary turbine member and one element of said gear unit during reverse drive operation and clutch means for connecting said secondary turbine member to another element of said gear unit when said mechanism is conditioned for reverse drive operation whereby a reverse driving torque is imparted to said secondary turbine member and transmitted to said driven member through said gear unit.

7. In a power transmission mechanism, a driving member, a driven member, a gear unit comprising a sun gear member, a ring gear member, a carrier member and planet gears mounted on said carrier member in meshing engagement with said sun and ring gear members, a first member of said gear unit being connected to said driven member, brake means for anchoring a second member of said gear unit to provide a forward driving torque reaction, a hydrokinetic unit comprising a pump member connected to said driving member, a primary turbine member and a secondary turbine member, the members of said hydrokinetic unit being disposed in fluid flow relationship, the primary member being drivably connected to a third member of said gear unit, overrunning clutch means for connecting said secondary turbine member to said third member of said gear unit, said overrunning clutch means forming a driving torque delivery path during forward drive operation and permitting rotation of said secondary turbine member in a direction opposite to the direction of rotation of said pump member during reverse drive operation, additional brake means for anchoring said primary turbine member and said third member of said gear unit and clutch means for coupling said secondary turbine member to said second member of said gear unit to condition said mechanism for reverse operation.

8. In a power transmission mechanism, a driving member, a driven member, a gear unit comprising a sun gear member, a ring gear member, a carrier member and planet gears mounted on said carrier member in meshing engagement with said sun and ring gear members, the carrier member of said gear unit being connected to said first gear member, brake means for anchoring the sun gear member of said gear unit to provide a torque reaction, a hydrokinetic unit comprising a pump member connected to said driving member, a primary turbine member and a secondary turbine member, the members of said hydrokinetic unit being disposed in fluid flow relationship, the primary turbine member being directly connected to the ring gear member of said gear unit, overrunning clutch means for connecting said secondary turbine member to said ring gear member, said overrunning clutch means forming an overrunning torque delivery path during forward drive operation and permitting rotation of said secondary turbine member in a direction opposite to the direction of rotation of said pump member during reverse drive operation, additional brake means for anchoring said primary turbine and said ring gear and clutch means for coupling said secondary turbine member to said sun gear to condition said mechanism for reverse drive operation.

9. In a power transmission mechanism, a driving member, a driven member, a gear unit comprising a sun gear member, a ring gear member, a carrier member and planet gears mounted on said carrier member in meshing engagement with said sun and ring gear members, the carrier member of said gear unit being connected to said driven member, brake means for anchoring the sun gear member of said gear unit to provide a torque reaction, a hydrokinetic unit comprising a pump member anchored to said driving member, a primary turbine member and a secondary turbine member, the members of said hydrokinetic unit being disposed in fluid flow relationship, the primary turbine member being directly connected to the ring gear member of said gear unit, overrunning clutch means for connecting said secondary turbine member to said ring gear member, said overrunning clutch means forming a one-way torque delivery path during forward drive operation and permitting rotation of said secondary turbine member in a direction opposite to the direction of rotation of said pump member during reverse drive operation, and additional brake means for anchoring said primary turbine and said ring gear member and clutch means for coupling said secondary turbine member to said sun gear member to condition said mechanism for reverse drive operation, said secondary turbine member being formed with a first blade section disposed at the fluid entrance region thereby and a second blade section disposed at the fluid flow exit region thereof, each section including flow directing blades, the blades of the second section being adjustable relative to the blades of the first section to provide a variation in the effective secondary turbine exit angle, the blades of said second section assuming one position during forward drive whereby a forward driving torque is imparted to the secondary turbine member and assuming a second position during reverse drive operation whereby a reverse secondary turbine torque is produced.

10. In a power transmission mechanism, a gear until comprising a sun gear member, a ring gear member, a carrier member and planet gears mounted on said carcarier member in meshing engagement with said sun and ring gear members, a first member of said gear unit being connected to driven portions of said mechanism, a hydrokinetic torque converter comprising a pump member, primary and secondary turbine members and a reactor member, said pump member being connected to a driving portion of the mechanism, means for simultaneously transmitting the torque of each turbine member of said hydrokinetic unit to a second member of said gear unit during forward drive operation, brake means for anchoring a third member of said gear unit to absorb the forward driving torque reaction, and additional brake means for braking said second member of said gear unit and clutch means for connecting a turbine member of said hydrokinetic unit to said third member of said gear unit to condition said mechanism for reverse drive operation, said gear unit being effective to transmit a reverse driving torque from said third member of said hydrokinetic unit to said driven portions of said mechanism during reverse drive operation.

11. In a power transmission mechanism, a gear unit comprising a sun gear member, a ring gear member, a carrier member and planet gears mounted on said carrier member in meshing engagement with the sun and ring gear members, the carrier member being in driving relationship with respect to power output portions of the mechanism, brake means for selectively anchoring said sun gear member, a hydrokinetic unit comprising a pump member, a primary turbine member and a secondary turbine member situated in fluid flow relationship, each of the members of said hydrokinetic unit comprising an inner and outer shroud defining in part the toroidal fluid flow path, flow directing blade elements situated between the shrouds of each member, means for drivably connecting the primary turbine member to said ring gear member, overrunning clutch means forming a one-way torque delivery path between said secondary turbine member and said ring gear member whereby the driving torque of said secondary turbine member supplements the driving torque of said primary turbine member, clutch means for selectively coupling said secondary turbine to said sun gear member, reverse brake means for anchoring said primary turbine member and said ring gear member including a friction member, a torque transfer member connected to said primary turbine member in the region of the inner shroud thereof and extending in the direction of the geometric axis of the hydrokinetic unit between the secondary turbine member said pump member, and a torque delivery shaft connecting said torque transfer member to said friction member, said mechanism being conditioned by reverse operation when said reverse brake and said clutch means are concurrently actuated and when said first named brake means is released.

12. The combination as set forth in claim 11 wherein said secondary turbine member includes two bladed sections, one section being disposed at the fluid flow entrance region of the secondary turbine member and the other being situated at the fluid flow exit region thereof, the blades of the other section of said secondary turbine being adjustable relative to the blades of the first section thereof to provide a change in the direction of the effective torque acting on the secondary turbine.

13. In a hydrokinetic unit for use with a power transmission mechanism having a driving member and a driven member, a pump member and a turbine member situated in fluid flow relationship, said turbine member comprising a bladed fluid entrance section and a bladed fluid exit section, each section including flow directing blades, said pump member being connected to said driving member, means for connecting the turbine member to said driven member, and means for adjusting the angularity of the blades of the exit section relative to the blades of the entrance section to condition the turbine member for torque delivery in either a forward or reverse direction, said turbine member comprising a hub portion and said adjusting means comprising a fluid pressure operated servo disposed within and defined in part by said hub portion, said servo including a fluid pressure operated member and a mechanical connection between said fluid pressure operated member and the blades of the exit section of said turbine member.

14. In a power transmission mechanism, a gear unit comprising a sun gear member, a ring gear member, a carrier member and planet gears mounted on said carrier member in meshing engagement with said sun and ring gear members, means for braking a first member of said gear unit to provide a torque reaction, a second member of said gear unit being connected to power output portions of said mechanism, a hydrokinetic unit comprising a pump member, a primary turbine member and a secondary turbine member, the primary turbine member being connected to a third member of said gear unit and one-way coupling means forming a driving connection between said secondary turbine member and said third member of said gear unit to supplement the driving torque of said primary turbine.

15. In a power transmission mechanism, a gear unit comprising a sun gear member, a ring gear member, a carrier member and planet gears mounted on said carrier member in meshing engagement with said sun and ring gear members, means for braking a first member of said gear unit to provide a torque reaction, a second member of said gear unit being connected to power output portions of said mechanism, the hydrokinetic unit comprising a pump member, a primary turbine member and a secondary turbine member, the primary turbine member being connected to a third member of said gear unit, one-way coupling means forming a driving connection between said secondary turbine member and said third member of said gear unit to supplement the driving torque of said primary turbine member and means for preventing free reverse rotation of said secondary turbine member during forward driving operation.

16. The combination as set forth in claim 15 wherein said last mentioned means includes a selectively operable clutch mechanism adapted to connect said secondary turbine member to said braking means for anchoring said secondary turbine member during a part of the forward driving range.

17. In a power transmission mechanism, a gear unit comprising a sun gear member, a ring gear member, a carrier member and planet gears mounted on said carrier in meshing engagement with the sun and ring gear members, means for braking a first member of said gear unit to provide a torque reaction, a second member of said gear unit being connected to a power output portion of said mechanism, a hydrokinetic unit comprising a pump member, a primary turbine member and a secondary turbine member, the members of the hydrokinetic unit being situated in fluid flow relationship, the primary turbine member being connected to one member of said gear unit, overrunning coupling means forming a one-way driving connection between said secondary turbine member and said one member of said gear unit to supplement the driving torque of the primary turbine, said secondary turbine member comprising separate sections at the fluid flow entrance and exit regions thereof, each section comprising flow directing blades, means for adjustably positioning the blades of the exit section relative to the blades of the entrance section, said secondary turbine member being adapted to deliver a negative torque to said gear unit when the blades of the exit section thereof assume one relative angular position and to deliver a forward driving torque to said gear unit when the blades of the exit section thereof assume another relative angular position, additional brake means for selectively anchoring said primary turbine member and said one member of said gear unit and clutch means for selectively coupling said secondary turbine member to said first member of said gear unit, said first named braking means being de-energized and said last named brake means and said clutch means being energized for conditioning the mechanism for reverse operation.

18. The combination as set forth in claim 17 wherein said secondary turbine member includes a hub portion and a servo mechanism situated in and partly defined by said hub portion, said servo mechanism including a fluid pressure operated member and a mechanical connection between said fluid pressure operated member and the blades of the exit section of said secondary turbine member for adjustably positioning the latter.

19. In a power transmission mechanism for delivering power from a driving member to a driven member, a hydrokinetic unit comprising primary and secondary turbine members and a pump member disposed in fluid flow relationship, said pump member being connected to said driving member, said primary turbine member being in driving relationship with respect to said driven member and adapted to deliver a positive driving torque to said driven member during forward drive operation, and means for conditioning said secondary turbine member for reverse torque delivery to effect reverse drive operation including a selectively engageable brake connected to said primary turbine member, said brake being adapted to anchor said primary turbine member when energized, and selectively engageable clutch means forming in part a reverse torque delivery path between said secondary turbine member and said driven member, said clutch means and said brake being energized during reverse drive.

20. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part separate torque delivery paths between said driven member and each bladed torque transmitting member, a first of said bladed torque transmitting members being connected directly to a first power input gear member of said gear unit whereby forward driving torque is delivered to said gear member during forward drive operation, a power output member of said gear unit being connected to said driven member, means including a selectively engageable clutch for connecting the other bladed torque transmitting member to another power input member of said gear unit during reverse drive operation, first brake means for anchoring selectively said first bladed torque transmitting member and said first power input member during reverse drive operation, and second brake means for anchoring said second power input member of said gear unit during forward drive operation, said first power input member functioning as a reaction member for said gear unit during reverse drive operation and said second power input member functioning as a reaction member for said gear unit during forward drive operation.

21. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part separate torque delivery paths between said driving member and each bladed torque transmitting member, said gear unit comprising a ring gear member, a sun gear member, a carrier member and planet gears carried by said carrier member in meshing engagement with said sun and ring gear members, a first of said bladed torque transmitting members being connected directly to said ring gear member of said gear unit whereby forward driving torque is delivered to said gear unit during forward drive operation, the carrier member of said gear unit being connected to said driven member, means including a selectively engageable clutch for connecting the other bladed torque transmitting member to said sun gear member of said gear unit during reverse drive operation, first brake means for anchoring selectively said first bladed torque transmitting member and said ring gear member of said gear unit during reverse drive operation, and second brake means for anchoring said sun gear during forward drive operation, said ring gear functioning as a reaction member for said gear unit during reverse drive operation and said sun gear functioning as a reaction member for said gear unit during forward drive operation.

22. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part torque delivery paths between said driven member and each bladed torque transmitting member, a first of said bladed torque transmitting members being connected directly to a first power input gear member of said gear unit whereby forward driving torque is delivered to said gear member during forward drive operation, a power output member of said gear unit being connected to said driven member, means for connecting the other bladed torque transmitting member to another power input member of said gear unit during reverse drive operation, first brake means for anchoring selectively said first bladed torque transmitting member and said first power input member during reverse drive operation, second brake means for anchoring said second power input member of said gear unit during forward drive operation, said first power input member functioning as a reaction member for said gear unit during reverse drive operation and said second power input member functioning as a reaction member for said gear unit during forward drive operation, said second bladed torque transmitting member being subjected to a hydrokinetic torque reaction during forward drive operation that is opposite in direction to the hydrokinetic torque reaction acting upon said first blade torque transmitting member, and coupling means for transferring said oppositely directed torque reaction of said second bladed torque transmitting member to said second brake means to inhibit rotation of said second bladed torque transmitting member in said opposite direction.

23. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part separate torque delivery paths between said driving member and each bladed torque transmitting member, said gear unit comprising a ring gear member, a sun gear member, a carrier member and planet gears carried by said carrier member in meshing engagement with said sun and ring gear members, a first of said bladed torque transmitting members being connected directly to said ring gear member of said gear unit whereby forward driving torque is delivered to said gear unit during forward drive operation, the carrier member of said gear unit being connected to said driven member, means including a selectively engageable clutch for connecting the other bladed torque transmitting member to said sun gear member of said gear unit during reverse drive operation, first brake means for anchoring selectively said first bladed torque transmitting member and said ring gear member of said gear unit during reverse drive operation, second brake means for anchoring said sun gear during forward drive operation, said ring gear functioning as a reaction member for said gear unit during reverse drive operation and said sun gear functioning as a reaction member for said gear unit during forward drive operation, said second bladed torque transmitting member being subjected to a hydrokinetic torque reaction during forward drive operation that is opposite in direction to the direction of the hydrokinetic torque reaction acting upon said first bladed torque transmitting member, and coupling means for transferring said oppositely directed torque reaction of said second bladed torque transmitting member to said second brake means to inhibit rotation of said second bladed torque transmitting member in said opposite direction.

24. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part torque delivery paths between said driven member and each bladed torque transmitting member, a first of said bladed torque transmitting members being connected directly to a first power input gear member of said gear unit whereby a forward driving torque is delivered to said gear member during forward drive operation, a power output member of said gear unit being connected to said driven member, means for connecting the other bladed torque transmitting member to another power input member of said gear unit during reverse drive operation, first brake means for anchoring selectively said first bladed torque transmitting member and said first power input member during reverse drive operation and second brake means for anchoring said second power input member of said gear unit during forward drive operation in a first forward driving speed ratio, said first power input member functioning as a reaction member for said gear unit during reverse drive operation and said second power input member functioning as a reaction member for said gear unit during forward drive operation in said first forward driving speed ratio, and selectively engageable direct drive clutch means for coupling together the members of said gear unit for conjoint rotation to establish a second high speed forward driving speed ratio.

25. In a power transmission mechanism for delivering power from a driving member to a driven member, a hydrokinetic unit comprising two bladed torque transmitting members and a bladed pump member disposed in fluid flow relationship, said pump member being connected to said driving member, a planetary gear unit forming in part separate torque delivery paths between said driving member and each bladed torque transmitting member, said gear unit comprising a ring gear member, a sun gear member, a carrier member and planet gears carried by said carrier member in meshing engagement with said sun and ring gear members, a first of said bladed torque transmitting members being connected directly to said ring gear member of said gear unit whereby forward driving torque is delivered to said gear unit during forward drive operation, the carrier member of said gear unit being connected to said driven member, means for connecting the other bladed torque transmitting member to said sun gear member of said gear unit during reverse drive operation, first brake means for anchoring selectively said first bladed torque transmitting member and said ring gear member during reverse drive operation, second brake means for anchoring said sun gear during forward drive operation in a first forward driving ratio, said ring gear functioning as a reaction member for said gear unit during reverse drive operation and said sun gear functioning as a reaction member for said gear unit during forward drive operation in said first forward driving speed ratio, and selectively engageable direct drive clutch means for coupling together the members of said gear unit for conjoint rotation to establish a second high speed forward driving speed ratio.

References Cited in the file of this patent

UNITED STATES PATENTS

| | | |
|---|---|---|
| 1,298,990 | Mason | Apr. 1, 1919 |
| 2,205,794 | Jandasek | June 25, 1940 |
| 2,292,482 | Roche | Aug. 11, 1942 |
| 2,293,358 | Pollard | Aug. 18, 1942 |
| 2,578,450 | Pollard | Dec. 11, 1951 |
| 2,695,533 | Pollard | Nov. 30, 1954 |
| 2,719,616 | Ahlen | Oct. 4, 1955 |